(12) United States Patent
Alspaugh et al.

(10) Patent No.: US 11,534,915 B1
(45) Date of Patent: Dec. 27, 2022

(54) DETERMINING VEHICLE INTEGRITY BASED ON OBSERVED BEHAVIOR DURING PREDETERMINED MANIPULATIONS

(71) Applicant: Amazon Technologies, Inc., Seattle, WA (US)

(72) Inventors: David L. Alspaugh, Seattle, WA (US); Pragyana K. Mishra, Seattle, WA (US); Dipan M. Shah, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 16/986,143

(22) Filed: Aug. 5, 2020

(51) Int. Cl.
| | |
|---|---|
| *B25J 9/00* | (2006.01) |
| *B25J 9/16* | (2006.01) |
| *B25J 9/04* | (2006.01) |
| *B25J 19/02* | (2006.01) |
| *B25J 13/08* | (2006.01) |
| *B25J 5/02* | (2006.01) |

(52) U.S. Cl.
CPC .............. *B25J 9/1633* (2013.01); *B25J 5/02* (2013.01); *B25J 9/042* (2013.01); *B25J 13/085* (2013.01); *B25J 19/026* (2013.01)

(58) Field of Classification Search
CPC .... B64C 13/503; B64C 13/505; G05D 1/0077
See application file for complete search history.

(56) References Cited

U.S. PATENT DOCUMENTS

| | | |
|---|---|---|
| 5,454,533 A | 10/1995 | Grant et al. |
| 6,374,982 B1 | 4/2002 | Cohen et al. |
| 7,373,844 B1 | 5/2008 | Chen et al. |

(Continued)

FOREIGN PATENT DOCUMENTS

| | | |
|---|---|---|
| DE | 102020125583 | 3/2022 |
| WO | 2020041819 | 3/2020 |
| WO | 2021231663 | 11/2021 |

OTHER PUBLICATIONS

Sonqalves, J. and p. Lima, "Grasp Planning with Incomplete Knowledge About the Object to be Grasped," 2019 IEEE International Conference on Autonomous Robot Systems and Competitions (ICARSC), 2019, pp. 1-6, doi: 10.1109/CARSC.2019.8733615.

(Continued)

*Primary Examiner* — Ian Jen
(74) *Attorney, Agent, or Firm* — Athorus, PLLC

(57) ABSTRACT

A vehicle or another object is grasped by a robotic arm of a handling system and caused to undergo one or more movements or manipulations resulting in a change of position, orientation, velocity or acceleration of the vehicle. Sensors provided in the robotic arm capture data representative of forces or torques imparted upon the robotic arm by the vehicle during or after the movement, or power or energy levels of vibration resulting from the movement. A signature representative of an inertial or vibratory response of the vehicle to the movement is derived based on the data. The signature may be compared to a baseline signature similarly derived for a vehicle that is known to be structurally and aerodynamically sound. If the signature is sufficiently similar to the baseline signature, the vehicle may also be determined to be structurally and aerodynamically sound.

20 Claims, 24 Drawing Sheets

(56) References Cited

U.S. PATENT DOCUMENTS

| | | | |
|---|---|---|---|
| 9,108,805 B2 | 8/2015 | Thomas | |
| 9,452,528 B1 * | 9/2016 | Checka | B25J 9/1612 |
| 9,687,982 B1 | 6/2017 | Jules et al. | |
| 9,718,195 B1 | 8/2017 | Youmans | |
| 10,166,676 B1 | 1/2019 | Hudson et al. | |
| 10,279,480 B1 | 5/2019 | Holson et al. | |
| 10,406,685 B1 | 9/2019 | Wilson | |
| 11,014,234 B2 | 5/2021 | Toshimitsu | |
| 11,091,256 B2 | 8/2021 | Cappelleri et al. | |
| 11,154,985 B1 | 10/2021 | Strauss | |
| 11,235,890 B1 | 2/2022 | Dahlstrom et al. | |
| 2006/0249623 A1 | 11/2006 | Steele | |
| 2007/0032923 A1 | 2/2007 | Mossman et al. | |
| 2009/0108605 A1 | 4/2009 | Becker et al. | |
| 2009/0294584 A1 | 12/2009 | Lovell et al. | |
| 2010/0280661 A1 | 11/2010 | Abdallah et al. | |
| 2013/0082137 A1 | 4/2013 | Gundlach et al. | |
| 2016/0144510 A1 | 5/2016 | Gulhar et al. | |
| 2017/0057081 A1 | 3/2017 | Krohne et al. | |
| 2017/0109465 A1 | 4/2017 | Nang et al. | |
| 2017/0277167 A1 | 9/2017 | Moda et al. | |
| 2018/0071874 A1 | 3/2018 | Bergeron et al. | |
| 2018/0217249 A1 | 8/2018 | Salla et al. | |
| 2018/0265295 A1 | 9/2018 | Beckman et al. | |
| 2018/0265296 A1 | 9/2018 | Beckman et al. | |
| 2018/0286119 A1 | 10/2018 | Leon et al. | |
| 2018/0345487 A1 | 12/2018 | Sandhu et al. | |
| 2019/0152055 A1 | 5/2019 | Abe | |
| 2019/0283251 A1 | 9/2019 | Nakamoto | |
| 2019/0321971 A1 | 10/2019 | Bosworth et al. | |
| 2019/0322384 A1 | 10/2019 | Bosworth | |
| 2020/0016756 A1 | 1/2020 | Rus et al. | |
| 2020/0024853 A1 | 1/2020 | Furrer et al. | |
| 2020/0027326 A1 | 1/2020 | Ravat | |
| 2020/0055195 A1 | 2/2020 | Ignakov | |
| 2020/0070354 A1 | 3/2020 | Nakayama et al. | |
| 2020/0361634 A1 | 11/2020 | Gil | |
| 2021/0023711 A1 | 1/2021 | Lee et al. | |
| 2021/0122039 A1 | 4/2021 | Su et al. | |
| 2021/0122056 A1 | 4/2021 | Menon et al. | |
| 2021/0125052 A1 | 4/2021 | Tremblay et al. | |
| 2021/0214163 A1 | 7/2021 | Deacon et al. | |
| 2021/0269149 A1 | 9/2021 | Culver | |
| 2021/0323171 A1 | 10/2021 | Ph/ac et al. | |
| 2021/0362334 A1 | 11/2021 | Yamane | |
| 2021/0387336 A1 | 12/2021 | Fukusen | |
| 2022/0226995 A1 | 7/2022 | Beck et al. | |

OTHER PUBLICATIONS

Sualtieri, M., A. t. Pas and R. Platt, "Pick and Place Without Geometric Object Models," 2018 IEEE International Conference on Robotics and Automation (ICRA), 2018, pp. 7433-7440, doi: 10.1109/ICRA.2018.8460553.

Janse Van Vuuren, J., L. Tang, I. Al-Bahadly and K. M. Arif, "A 3-Stage Machine Learning-Based Novel Object Yasping Methodology," in IEEE Access, vol. 8, p. 74216-74236, 2020, doi: 10.1109/ACCESS.2020.2987341.

Paletta, L., Fritz, G., Kintzler, F Irran, J., and Dorffher, G. (2007). "Perception and Developmental Learning of Affordances in Autonomous Robots," In Annual Conference on Artificial Intelligence (Cambridge: Springer), 235-250. ioi: 10.1007/978-3-540-74565-5_19 (Year: 2007).

Via, F. E., Bekiroglu, Y., Smith, C., Karayiannidis, Y., Kragic, D. (2013). Predicting Slippage and Learning Manipulation Affordances Through Gaussian Process Regression. In 2013 13th IEEE-RAS International Conference an Humanoid Robots (Humanoids) (pp. 462-468). (Yean 2013).

Vohra, M., R. Prakash and L. Behera, "Real-time Grasp Pose Estimation for Novel Objects in Densely Cluttered Environment," 2019 28th IEEE International Conference on Robot and Human Interactive Communication (RO-MAN), 2019, pp. 1-6, doi: 10.1109/RO-MAN46459.2019.8956438.

* cited by examiner

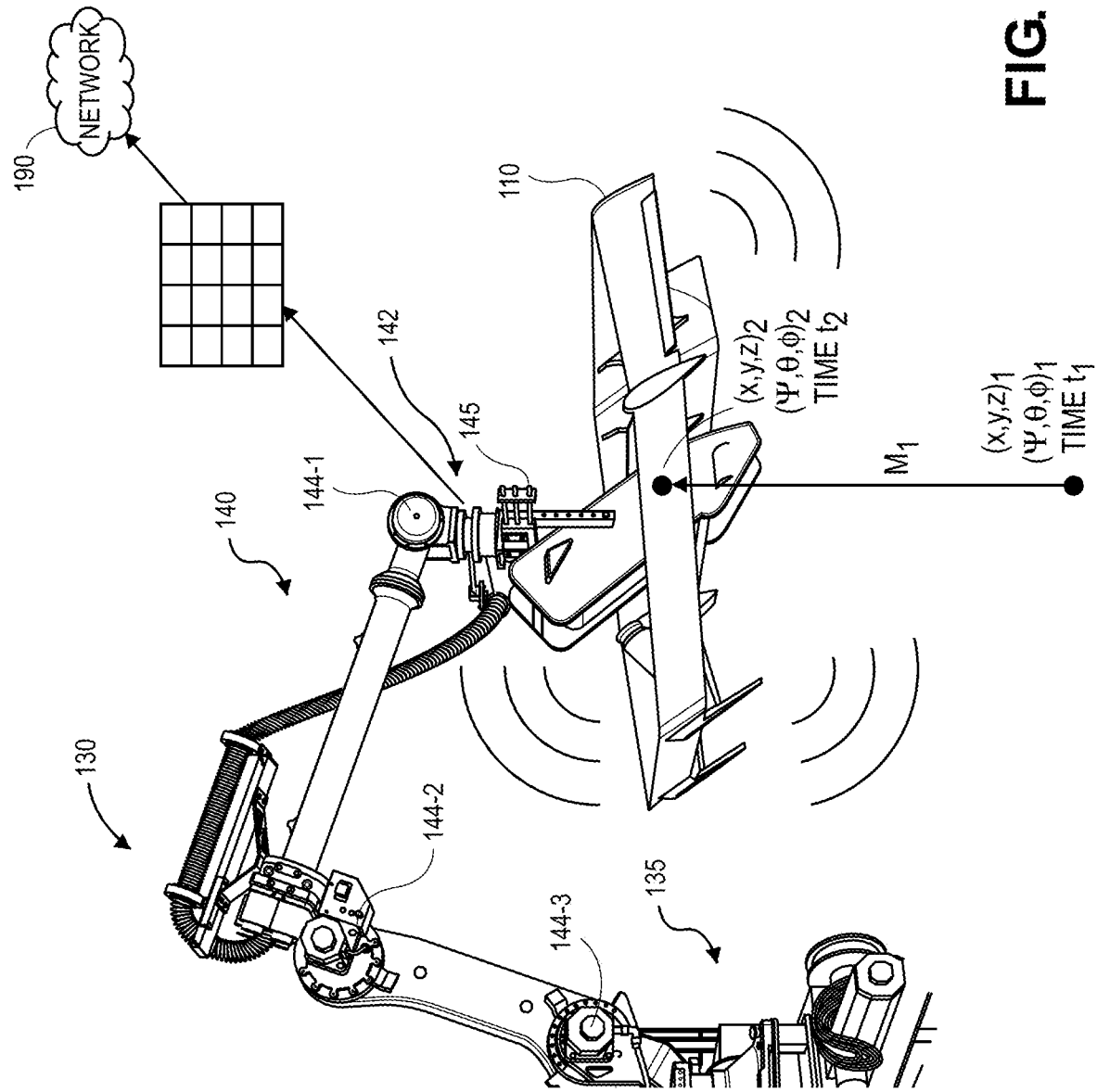

INERTIAL SIGNATURE DERIVED FROM DATA CAPTURED DURING OR AFTER MOVEMENTS

VIBRATORY SIGNATURE DERIVED FROM DATA CAPTURED DURING OR AFTER MOVEMENTS

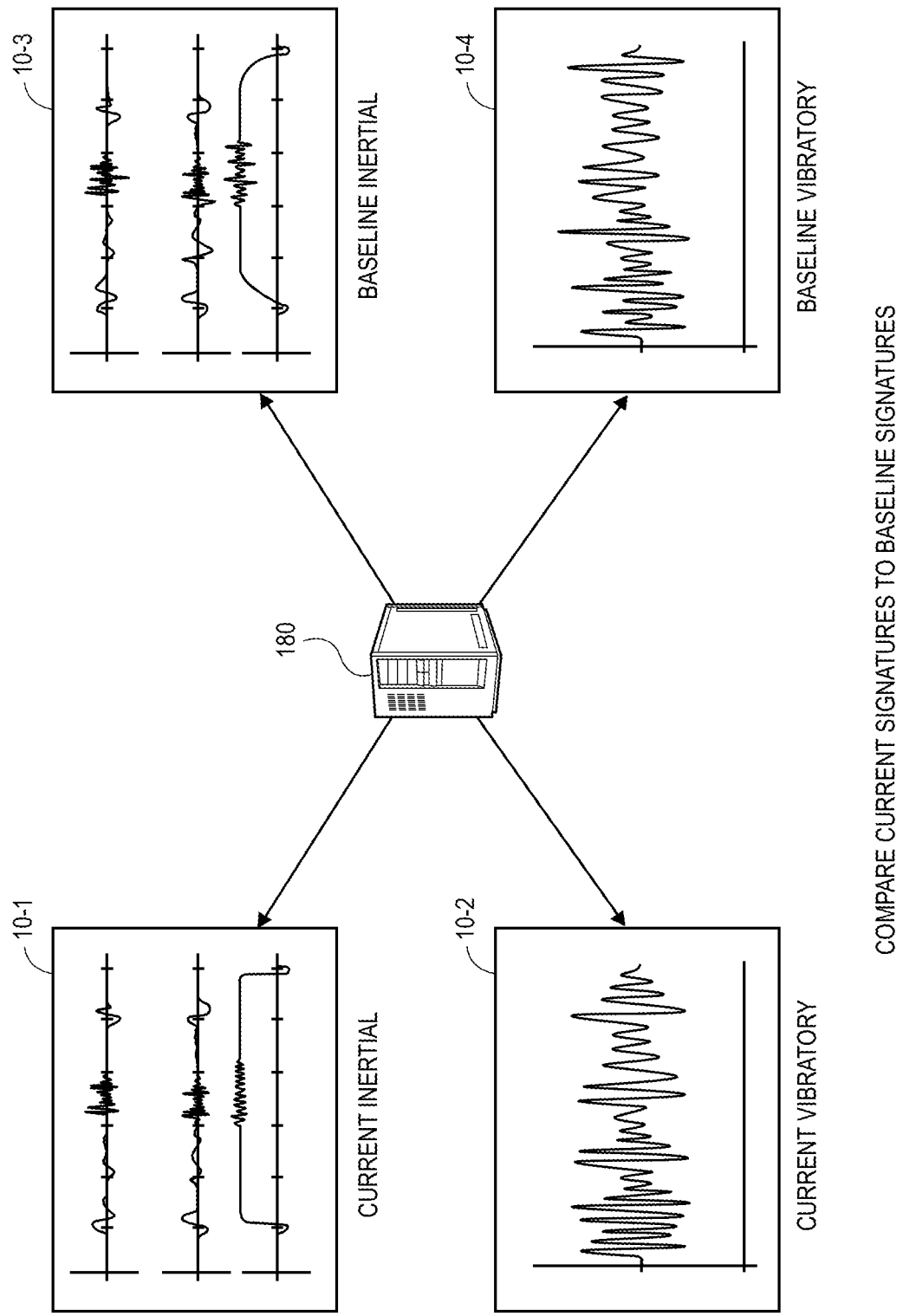

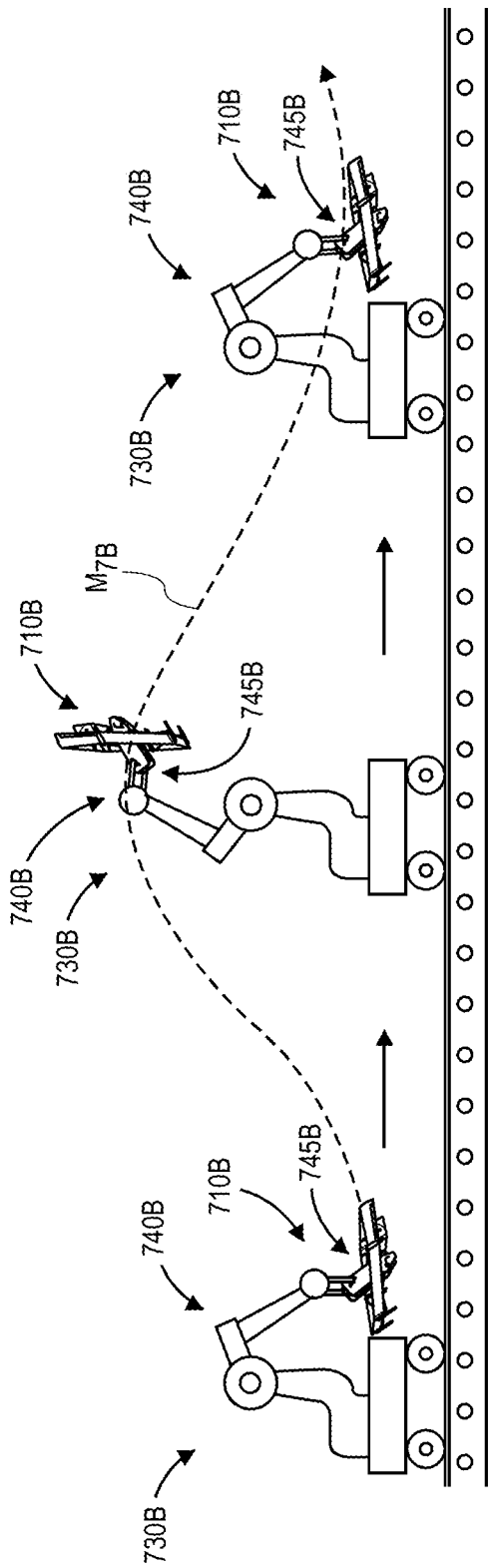

DETERMINING VEHICLE INTEGRITY BASED ON OBSERVED BEHAVIOR DURING PREDETERMINED MANIPULATIONS

BACKGROUND

Today, many complex, high technology machines are manufactured or assembled from a number of components that are specifically configured to operate together. Typically, an aerial vehicle (e.g., an unmanned aerial vehicle, or "UAV," such as a drone) may be formed from lightweight metals, plastics or composites and outfitted with motors, rotors or other systems that are designed to permit the aerial vehicle to meet or exceed a number of operational constraints or requirements including speed, altitude or lift. Many aerial vehicles (such as UAVs, or drones) are built from molded plastic frames and outfitted with electric motors powered by onboard batteries or other power sources that permit the vehicles to conduct lifting or thrusting operations, while larger vehicles feature frames and skins formed from aluminum, titanium or carbon fiber, and are equipped with petroleum-powered engines capable of generating hundreds or thousands of pounds-force.

When an aerial vehicle is manufactured, a number of different inspections or evaluations are performed on the aerial vehicle in order to ensure that the aerial vehicle is structurally and aerodynamically sound, and has a sufficiently high level of integrity. When inspecting or evaluating an aerial vehicle, one or more propulsion motors may be operated to rotate propellers, control surfaces may be moved within ranges of positions or alignments, and extensions or appurtenances may be rotated, extended or otherwise subjected to a number of tests or operations in order to clear the aerial vehicle to perform one or more missions.

Occasionally, when an aerial vehicle performs one or more missions, the structural and aerodynamic soundness or integrity of the aerial vehicle may be adversely affected. For example, during a mission, an aerial vehicle may be subjected to one or more shocks, impacts or other physical effects, or may be subjected to unfavorable operating or environmental conditions. As a result, one or more struts, arms or other internal or external components may be loosened, damaged or otherwise placed in a suboptimal state. Similarly, when an aerial vehicle is newly constructed or assembled, the various components of the aerial vehicle may not be properly joined or mated with one another, and the newly constructed or assembled aerial vehicle may likewise be in a suboptimal state.

Frequently, many discrepancies or deficiencies in the state of an aerial vehicle are invisible to the naked eye. Therefore, after an aerial vehicle has been newly constructed or assembled, or when an aerial vehicle has completed a mission, the aerial vehicle must be subjected to a number of inspections or evaluations in order to confirm that the aerial vehicle is capable of performing other missions. Such inspections or evaluations take time, however, and require the aerial vehicle to be taken out of service until they have been completed.

BRIEF DESCRIPTION OF THE DRAWINGS

FIGS. 1A through 1G are views of aspects of one system for determining vehicle integrity in accordance with embodiments of the present disclosure.

FIGS. 7A through 7C are views of aspects of one system for determining vehicle integrity in accordance with embodiments of the present disclosure.

DETAILED DESCRIPTION

Figure 1A:
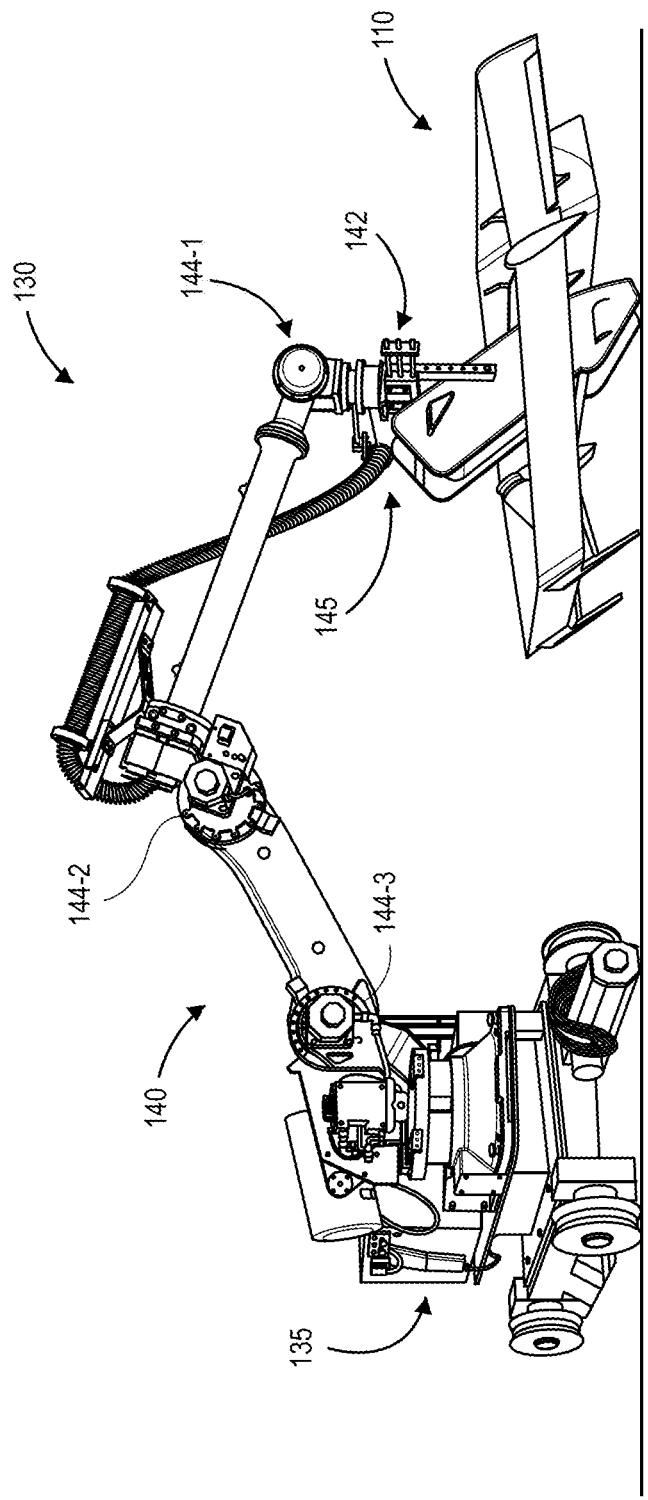

As is set forth in greater detail below, the present disclosure is directed to systems and methods for determining a level or measure of integrity of an object (e.g., a vehicle, such as a UAV, or any other object) by manipulating the object to perform one or more movements or other manipulations, and observing the physical behavior of the vehicle in response to such movements or manipulations based on data captured using one or more sensors. More specifically, one or more systems and methods of the present disclosure are directed to generating a signature representative of an inertial and/or a vibratory response of an object (e.g., a vehicle) to a movement or manipulation that results in a change in position, orientation, velocity or acceleration of the object based on data captured by a handling system that caused the object to undergo the movement or manipulation. The handling system may be stationary or mobile, and may be outfitted or equipped with one or more sensors to observe the behavior of the object in response to the movement or other manipulation. In some embodiments, a handling system may include a robotic arm having a number of articulating pivots and a grasping element at an end effector of the robotic arm that is adapted to mate with corresponding portions of an object (e.g., a vehicle). Data captured by the handling system may represent one or more attributes or values of the behavior of the object in response to a movement or other manipulation, and may be captured by force sensors, torque sensors, imaging devices (e.g., cameras), microphones, laser emitters, or other sensors provided in any location or configuration with respect to a handling system, e.g., in any location on a robotic arm.

Once the data is captured, one or more signatures representative of the inertial or vibratory response of the object during the movement or other manipulation may be derived from the data accordingly. For example, where a robotic arm of a handling system is outfitted with one or more force sensors or torque sensors, data representing forces or torques about one or more axes that is captured by such sensors during or after a movement or other manipulation may be used to derive a signature representative of the inertial effects of the movement or other manipulation on the vehicle over time. In some embodiments, an inertial signature may represent a set of forces and/or torques that are required to cause a given object to undergo a given movement or other manipulation, e.g., to keep the object moving or rotating in accordance with the movement or other manipulation, such as at a desired linear velocity along the one or more axes or at a desired angular velocity about the one or more axes.

Similarly, at least a subset of the data representing the forces or torques may be transformed to a frequency domain and used to derive a signature representative of the vibratory effects of the movement or other manipulation on the vehicle over a range of frequencies. In some embodiments, a vibratory signature may describe modes of vibration of the object during at least a subset of a given movement or other manipulation, and may be derived based on a subset of the data, e.g., after transforming at least the subset of the data to a frequency domain.

A signature derived for a vehicle based on data captured during or after a movement or a manipulation may be compared to a signature previously derived for the vehicle in response to the same movement or other manipulation (e.g., a baseline signature) at a time the vehicle was known to comply with one or more relevant standards, regulations or requirements, or a signature derived for one or more other vehicles that are substantially identical to the vehicle, and have been confirmed to comply with one or more standards, regulations or requirements. If the signatures are substantially identical to one another, e.g., if a currently derived signature sufficiently corresponds to or matches a previously derived signature, then a condition of the vehicle may be determined to be compliant with the one or more standards, regulations or requirements, and cleared to perform one or more missions without further delay. If the signatures are not substantially identical to one another, however, then the vehicle may be blocked from performing one or more missions until inspections, maintenance or repairs are performed.

Referring to FIGS. 1A through 1G, views of aspects of one system for determining vehicle integrity in accordance with embodiments of the present disclosure are shown. As is shown in FIG. 1A, a handling system 130 includes a carriage 135 and a robotic arm 140. The carriage 135 includes a base having one or more sets of wheels that are configured for stationary or mobile operation on one or more ground surfaces, one or more sets of rails, or on any other suitable surfaces. The robotic arm 140 has a proximal end that is mounted to the base or another portion of the carriage 135, and a distal end that is configured to mate with and grasp one or more objects, such as an aerial vehicle 110 (or any other object). The robotic arm 140 includes one or more sensors 142, a plurality of segments joined by articulating pivots 144-1, 144-2, 144-3 and an end effector 145 having one or more grasping elements. The aerial vehicle 110 (e.g., an unmanned aerial vehicle, or drone) includes a frame having a plurality of motors coupled thereto, with each of the motors being coupled to a propeller or other rotor by a drive shaft and configured to rotate the propeller about an axis defined by the drive shaft.

The sensors 142 may include one or more load cells or other sensors for determining forces or torques acting upon the robotic arm 140. Alternatively, or additionally, the sensors 142 may include one or more laser range sensors, cameras, microphones, or other sensors. The articulating pivots 144-1, 144-2, 144-3 permit the robotic arm 140 to operate with six degrees of freedom for translation or rotation along or about an x-axis, ay-axis and a z-axis. The end effector 145 may include one or more arms or engagement systems that are configured to mate with one or more contact points on the aerial vehicle 110, and to releasably yet securely grasp the aerial vehicle 110 thereon or therebetween.

In accordance with embodiments of the present disclosure, a handling system, such as the handling system 130, may grasp or otherwise engage with an object, such as the aerial vehicle 110, and subject the object to one or more movements or other manipulations, e.g., by the robotic arm 140. For example, as is shown in FIG. 1A, the end effector 145 at the distal end of the robotic arm 140 may grasp the aerial vehicle 110 while the aerial vehicle 110 rests on a ground surface or in any other location. As is shown in FIGS. 1B through 1D, the robotic arm 140 lifts the aerial vehicle 110 from the ground surface upon which the aerial vehicle 110 rested to a predetermined height above the ground surface, carries the aerial vehicle 110 over the ground surface by a predetermined distance, and places the aerial vehicle 110 on the ground surface.

In accordance with embodiments of the present disclosure, information or data captured during or after a handling system causes an object, such as the aerial vehicle 110, to undergo one or more movements or other manipulations is processed to determine a inertial and vibratory response of the object to the movements or manipulations. For example, as is shown in FIG. 1B, the sensors 142 capture information or data during and after a movement $M_1$ from a first position in three-dimensional space and a first orientation about one or more axes (e.g., x-, y- and z-axes, or yaw, pitch and roll axes), such as a position $(x, y, z)_1$ and an orientation $(\varphi, \theta, \phi)_1$, at a time $t_1$ to a second position in three-dimensional space and a second orientation about the one or more principal axes, such as a position $(x, y, z)_2$ and an orientation $(\varphi, \theta, \phi)_2$, at a time $t_2$. The sensors 142 capture forces, torques, vibrational power or energy, or other attributes of an inertial or vibratory response of the aerial vehicle 110 to the movement $M_1$ between the time $t_1$ and the time $t_2$, or after the time $t_2$, at any frequency or interval. The information or data captured by the sensors 142 may be transmitted to one or more external computer devices over a network 190, which may but need not include the Internet in whole or in part.

Figure 1C:
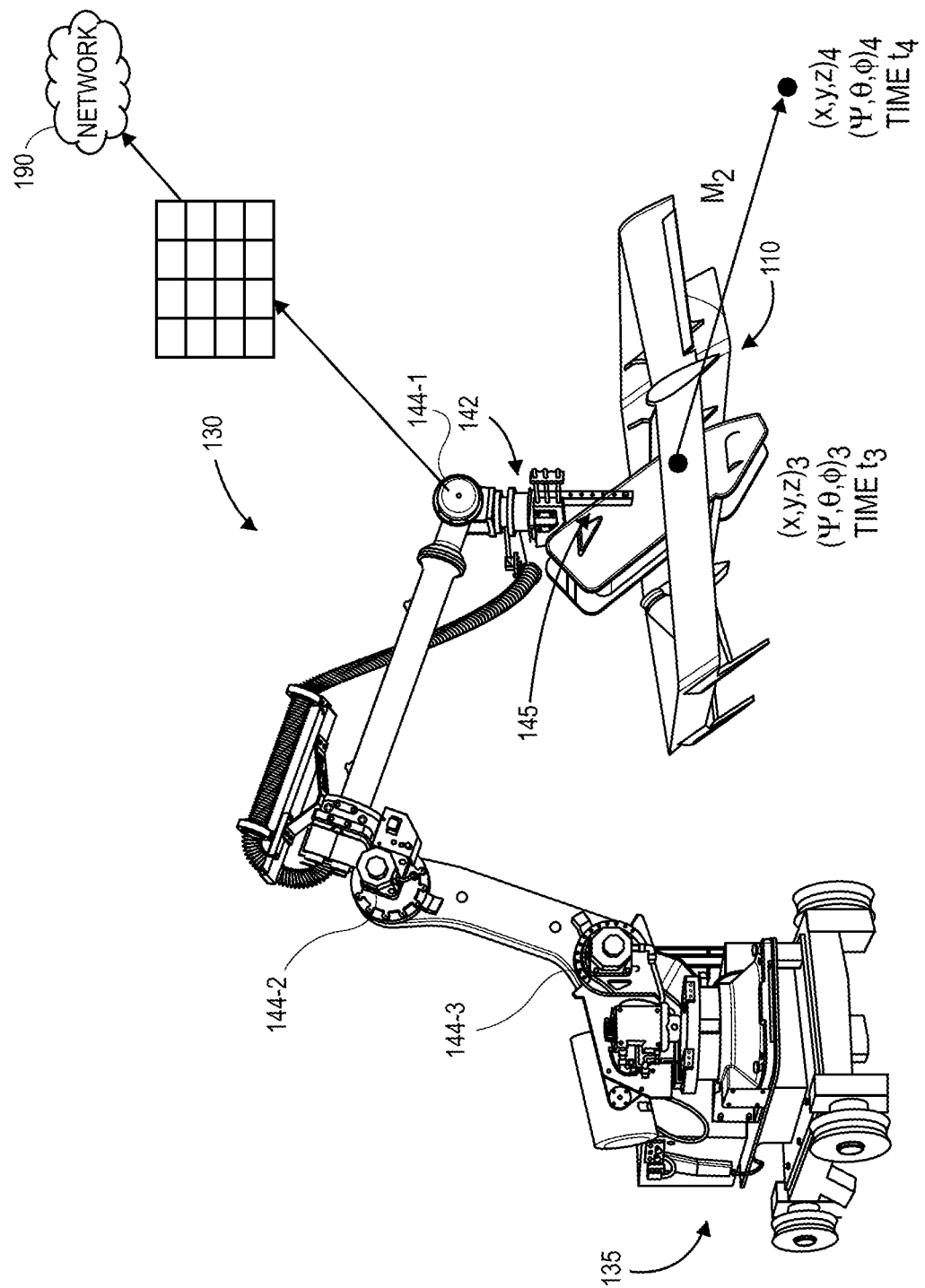

Similarly, as is shown in FIG. 1C, the sensors 142 capture information or data during and after a movement $M_2$ from a third position in three-dimensional space and a third orientation about one or more axes, such as a position $(x, y, z)_3$ and an orientation $(\varphi, \theta, \phi)_3$, at a time $t_3$ to a fourth position in three-dimensional space and a fourth orientation about the one or more principal axes, such as a position $(x, y, z)_4$ and an orientation $(\varphi, \theta, \phi)_4$, at a time $t_4$. The sensors 142 capture forces, torques, vibrational power or energy, or other attributes of an inertial or vibratory response of the aerial vehicle 110 to the movement $M_2$ between the time $t_3$ and the time $t_4$, or after the time $t_4$, at any frequency or interval, and transmit the information or data to one or more external computer devices over the network 190.

Figure 1D:
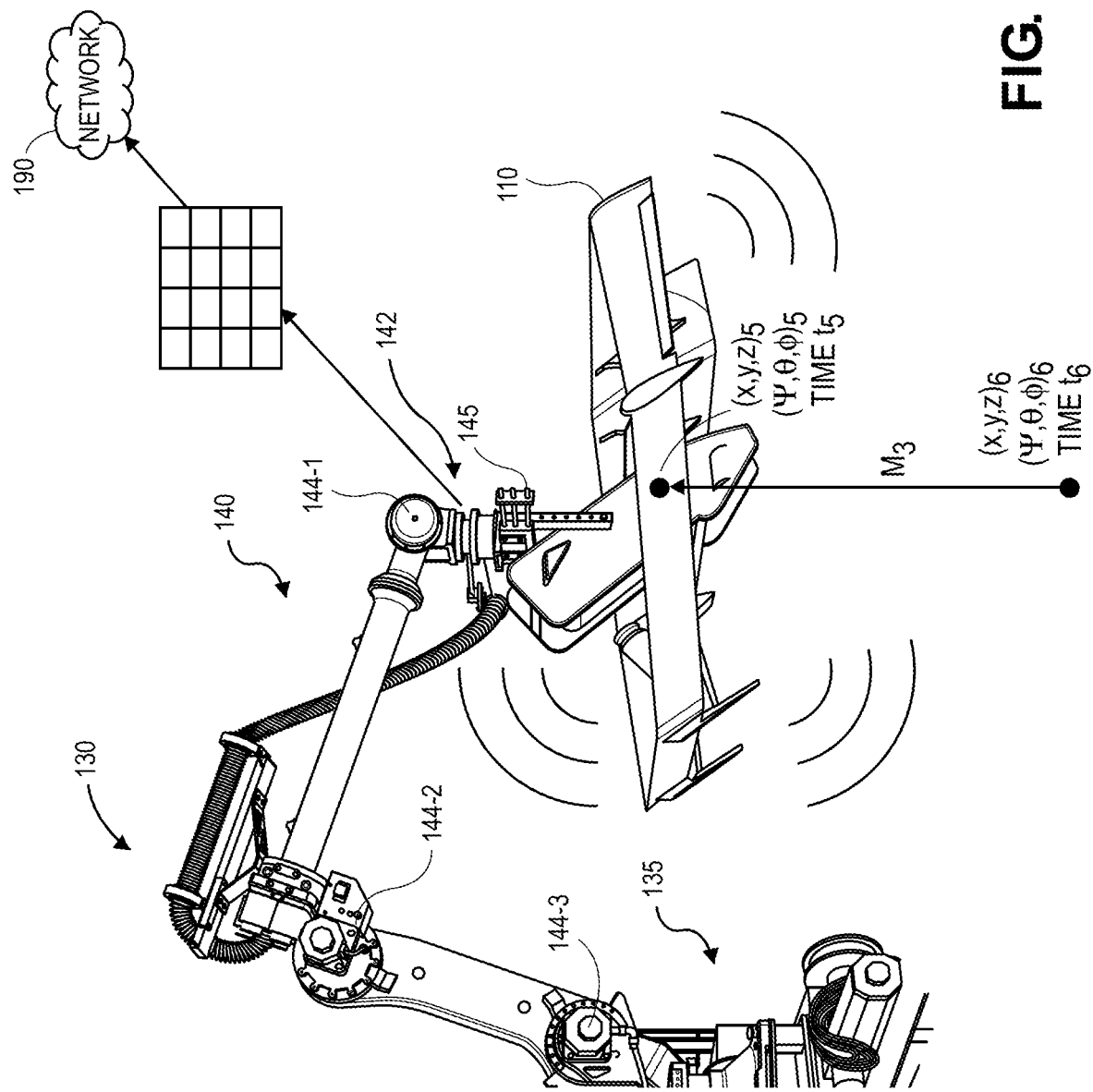

As is shown in FIG. 1D, the sensors 142 also capture information or data during and after a movement $M_3$ from a fifth position in three-dimensional space and a fifth orientation about one or more axes, such as a position $(x, y, z)_5$ and an orientation $(\varphi, \theta, \phi)_5$, at a time $t_5$ to a sixth position in three-dimensional space and a sixth orientation about the one or more principal axes, such as a position $(x, y, z)_6$ and an orientation $(\varphi, \theta, \phi)_6$, at a time $t_6$. The sensors 142 capture forces, torques, vibrational power or energy, or other attributes of an inertial or vibratory response of the aerial vehicle 110 to the movement $M_3$ between the time $t_5$ and the time $t_6$, or after the time $t_6$, at any frequency or interval, and transmit the information or data to one or more external computer devices over the network 190.

Figure 1E:
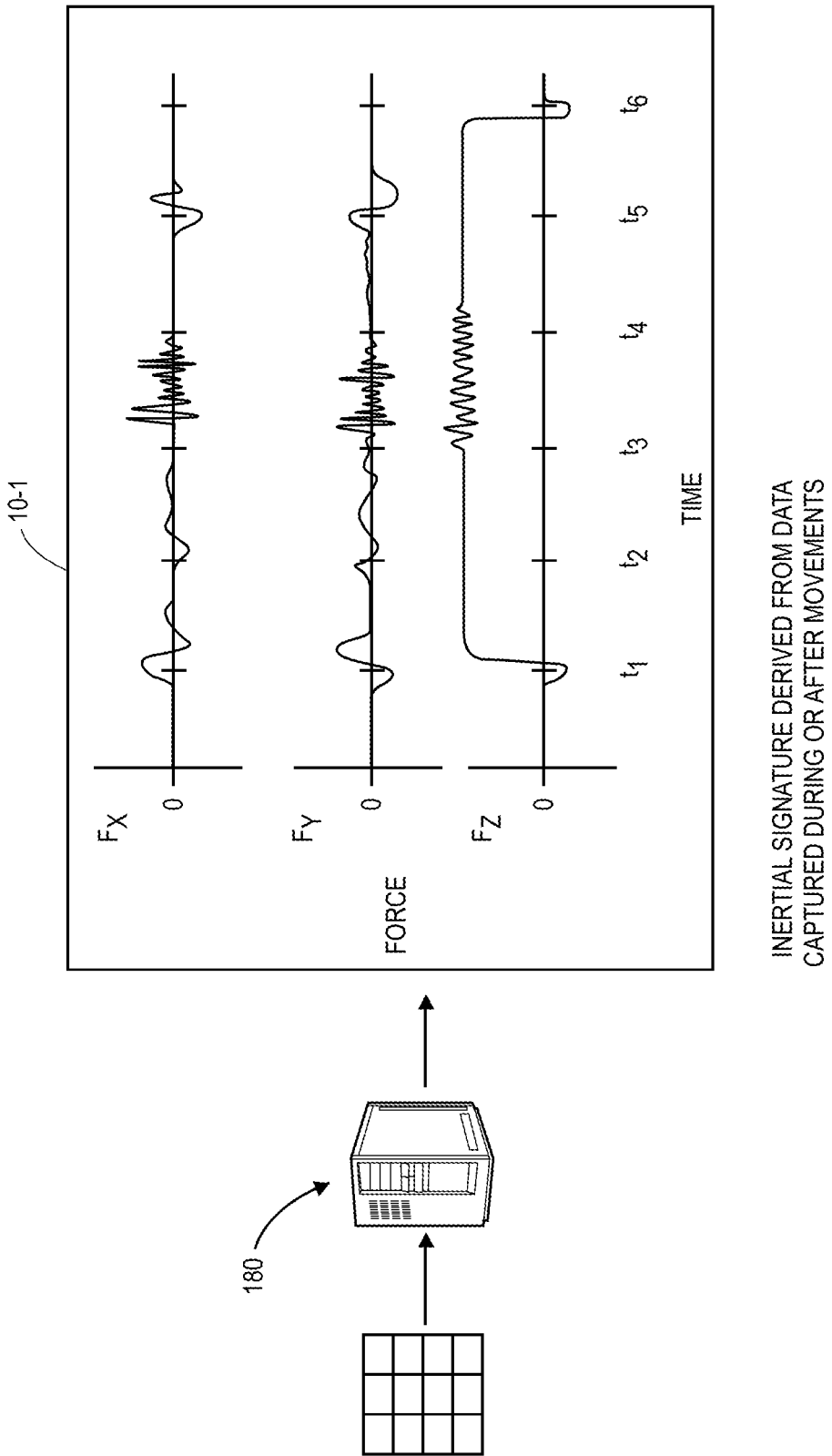

As is shown in FIG. 1E, a server 180 or another external computer device or system may process the information or data captured by the sensors 142 during or after the movements $M_1$, $M_2$, $M_3$ shown in FIGS. 1B through 1D in order to derive a signature 10-1 representative of an inertial response of the aerial vehicle 110 to the movements $M_1$, $M_2$, $M_3$. For example, the information or data representative of the forces $F_x$, $F_y$, $F_z$ along the x-axis, the y-axis and the z-axis, respectively, that are sensed during or after the movement $M_1$ that lifted the aerial vehicle 110 from the ground surface, during or after the movement $M_2$ that carried the aerial vehicle 110 over the ground surface, or during or after the movement $M_3$ that lowered the aerial vehicle 110 to the ground surface. The signature 10-1 may be generated based on a plot or other representation of the forces $F_x$, $F_y$, $F_z$ along the x-axis, the y-axis and the z-axis over time, or in any other manner. Alternatively, the information or data may be captured by the sensors 142 during or after any other movements, and the server 180 may generate the signature 10-1 based on torques, power levels, energy levels, or any other attributes of the aerial vehicle 110.

Figure 1F:
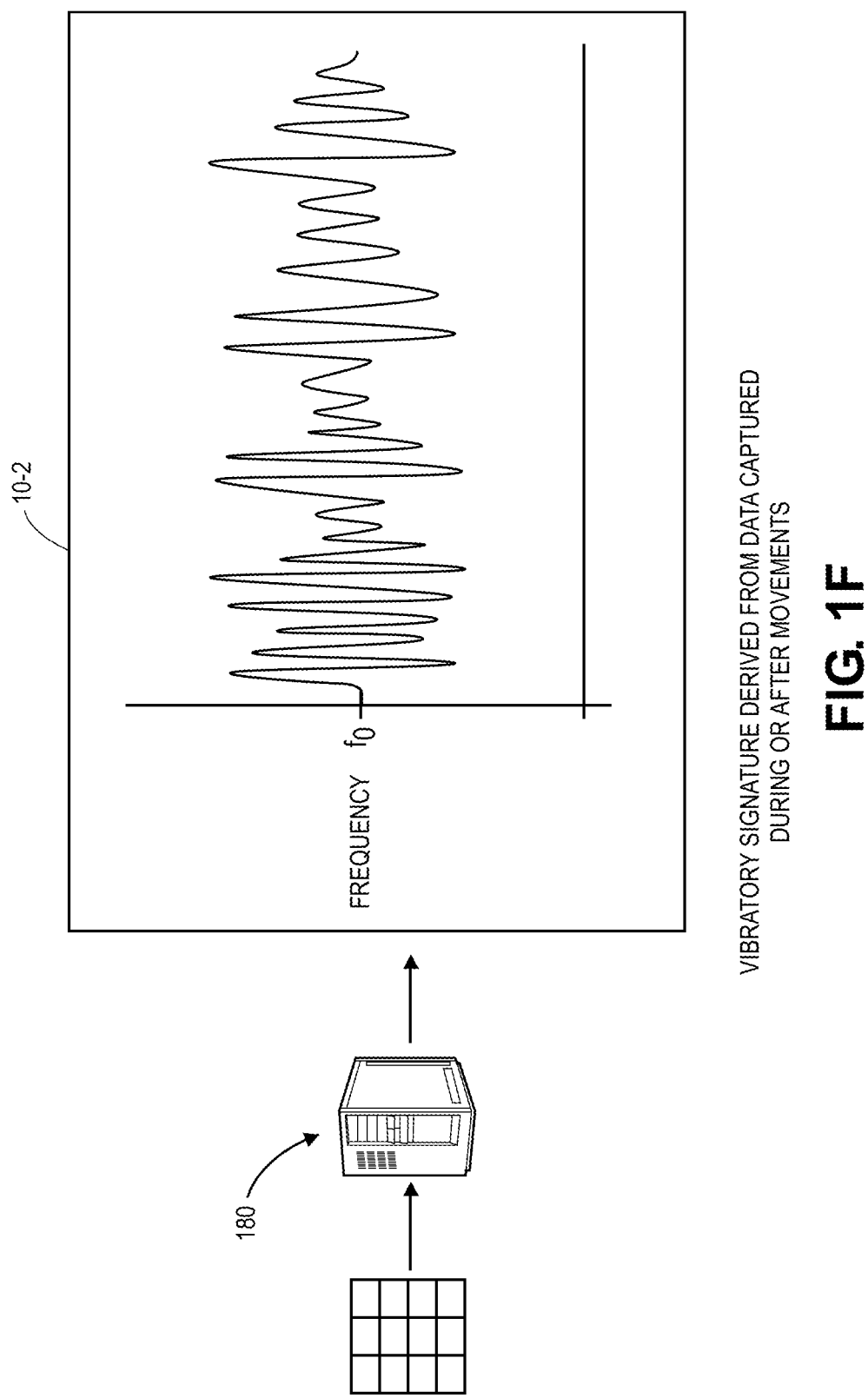

Similarly, as is shown in FIG. 1F, the server 180 may process at least a portion of the information or data captured by the sensors 142 during or after the movements $M_1$, $M_2$, $M_3$ shown in FIGS. 1B through 1D in order to derive a signature 10-2 representative of a vibratory response of the aerial vehicle 110 to the movements $M_1$, $M_2$, $M_3$. For example, the information or data representative of the forces sensed during or after the movements $M_1$, $M_2$, $M_3$ may be transformed to a frequency domain, e.g., by a fast Fourier transform, in order to identify power levels or energy levels of vibration of the aerial vehicle 110 over a range of frequencies, and, alternatively, one or more natural frequencies of vibration of the aerial vehicle 110. The signature 10-2 may be generated based on a plot or other representation of the power levels or energy levels of vibration over a range of frequencies, or in any other manner.

In accordance with embodiments of the present disclosure, one or more determinations regarding the integrity of the aerial vehicle 110, including but not limited to determinations regarding the adequacy of construction of the aerial vehicle 110, or the suitability or fitness of the aerial vehicle 110 to perform one or more missions, can be made by comparing the signature 10-1 or the signature 10-2 to inertial or vibratory signatures previously derived for the aerial vehicle 110. As is shown in FIG. 1G, the signature 10-1 representative of the inertial response of the aerial vehicle 110 to the movements $M_1$, $M_2$, $M_3$ and the signature 10-2 representative of the vibratory response of the aerial vehicle 110 to the movements $M_1$, $M_2$, $M_3$ may be compared to baseline signatures 10-3, 10-4 previously derived for the aerial vehicle 110 based on information or data captured when the aerial vehicle 110 was subjected to the same movements $M_1$, $M_2$, $M_3$ shown in FIGS. 1, 1C and 1D at times when the aerial vehicle 110 was known to be structurally sound and to have a sufficiently high level of integrity. Alternatively, the baseline signatures 10-3, 10-4 may have been previously derived after subjecting a substantially similar aerial vehicle, e.g., one or more of a class of aerial vehicles of which the aerial vehicle 110 is a part, to the movements $M_1$, $M_2$, $M_3$ shown in FIGS. 1B, 1C and 1D. To the extent that the signature 10-1 is sufficiently similar to the baseline signature 10-3, or that the signature 10-2 is sufficiently similar to the baseline signature 10-4, thereby indicating that the inertial and vibratory response to the movements $M_1$, $M_2$, $M_3$ of the aerial vehicle 110 at the different times was sufficiently similar, the soundness and the integrity of the aerial vehicle 110 at such times may also be presumed to be substantially similar to one another.

Accordingly, determinations regarding the integrity of a vehicle or another object may be made by subjecting a vehicle or other object that is known to be structurally sound and of a suitably high level of integrity to one or more predetermined movements or manipulations, and capturing information or data representative of the inertial or vibratory response of the vehicle or other object to the movements or manipulations. A baseline signature of an inertial response may be derived based on the information or data, e.g., based on a plot or other representation of forces imparted upon a handling system by an aerial vehicle over a period of time, while a baseline signature of a vibratory response may be derived by transforming the information or data into a frequency domain, and plotting or otherwise representing power or energy levels of vibration over a range of frequencies. The baseline signatures may be stored in association with the vehicle or other object.

Subsequently, when a condition of the vehicle or other object is uncertain, such as after a vehicle has performed one or more missions or been subjected to maintenance, inspections or repairs, the vehicle or other object may be subjected to the same movements or manipulations upon which the baseline signatures were based. Signatures of inertial and vibratory responses to the movements or manipulations at times when the condition of the vehicle or other object is uncertain may be derived from the information or data captured following such movements or manipulations and compared to the baseline signatures. To the extent that the signatures are sufficiently similar to the baseline signatures, the vehicle or other object may be determined to also be structurally sound or to have a suitably high level of integrity. To the extent that the signatures are not sufficiently similar to the baseline signatures, however, the vehicle or other object may require one or more inspections or other evaluations to be performed before the vehicle or other object may be cleared to perform one or more other missions, or utilized in one or more selected applications.

Vehicles, such as aerial vehicles, or other high technology machines or systems are typically evaluated from time to time in order to check for failures or deficiencies in materials or components. Because vehicles are commonly subjected to adverse operating or environmental conditions, impacts or other adverse events, vehicles must be routinely tested to properly assess risks of failure of a specific component, of a vehicle as a whole, or of vehicles in a class or fleet. Whether conditions or deficiencies exist on a vehicle may be assessed with respect to structural components, control surfaces, motors, propellers or appurtenances such as landing gear by performing one or more testing evolutions.

As a vehicle is maintained in a specific pose (e.g., a position and an orientation), or undergoes one or more specified movements or other manipulations, the vehicle tends to vibrate or exert forces or torques in expected, well-understood manners. For example, when a vehicle is grasped or otherwise engaged by a robotic arm or other component of a handling system, causing the vehicle to move in a predetermined movement or manipulation, e.g., resulting in a predetermined change in position, orientation, velocity or acceleration of the vehicle, the forces, torques, or other aspects of the inertial or vibratory response of the vehicle may be observed in data captured by one or more sensors of the handling system and modeled in the form of a signature.

A signature derived from data captured during a movement or manipulation of a vehicle or another object may be compared to other signatures that are similarly derived, e.g., based on data captured during the same movement or manipulation of the same vehicle or of a substantially similar vehicle, such as another vehicle of a common design, class or fleet. For example, a vehicle that is structurally and aerodynamically sound and of sufficient integrity should exhibit the same inertial or vibratory response each time that the vehicle is subjected to the same predetermined movement or manipulation. Therefore, signatures derived from data captured during or after the same predetermined movement or manipulation by the same vehicle should be identical or substantially identical to one another. Moreover, two vehicles that are substantially identical to one another, e.g., vehicles of a common design, class or fleet, and are both structurally and aerodynamically sound and of sufficient integrity should also exhibit the same inertial or vibratory response when the two or more vehicles are subjected to the same predetermined movement or manipulation. Signatures derived from data captured during or after the same predetermined movement or manipulation by the two or more vehicles should also be identical or substantially identical to one another.

Conversely, where the same vehicle exhibits a different inertial or vibratory response after being subjected to the same predetermined movement or manipulation at different times, the vehicle may be determined to be in a different condition, or at a different level of integrity, at the different times. For example, where a baseline signature is derived for a structurally and aerodynamically sound vehicle based on data captured as the vehicle is subjected to a predetermined movement or manipulation, the vehicle may be subjected to the predetermined movement or manipulation again and again. Signatures derived based on data captured during the movements and manipulations may be compared to the baseline signature. Where the signatures are sufficiently similar to the baseline signature, the vehicle may be determined to be structurally and aerodynamically sound, and may be cleared to perform one or more missions. Where one of the signatures is not sufficiently similar to the baseline signature, however, the vehicle may be blocked from performing one or more missions until maintenance, inspections or repairs are performed.

Similarly, where a baseline signature is derived for a structurally and aerodynamically sound vehicle of a common design, class or fleet based on data captured as the vehicle is subjected to a predetermined movement or manipulation, other vehicles of the common design, class or fleet may also be subjected to the predetermined movement or manipulation. Where a signature derived from data captured as one of the vehicles of the common design, class or fleet is subjected to the predetermined movement or manipulation is sufficiently similar to the baseline signature, that one of the vehicles may be determined to be structurally and aerodynamically sound, and may be cleared to perform one or more missions. Where a signature derived from data captured as one of the vehicles of the common design, class or fleet is subjected to the predetermined movement or manipulation is not sufficiently similar to the baseline signature, however, that one of the vehicles may be determined to be not structurally or aerodynamically sound, or to require further maintenance, inspections or repairs.

In accordance with embodiments of the present disclosure, an object, such as a vehicle, may be subjected to any type or form of movement or manipulation that results in a change in position, orientation, velocity or acceleration of the object. For example, a handling system may engage with a vehicle, e.g., by an end effector, a grasping element or other aspect of a robotic arm, and cause the vehicle to move in any selected direction, for any selected distance, or at any selected speed or velocity, or to rotate about one or more axes, e.g., an x-axis, ay-axis or a z-axis, or a yaw axis, a pitch axis or a roll axis, by any selected angular extent. Furthermore, in some embodiments, the handling system may be mobile in nature, and may impart additional motion onto the vehicle during a movement or other manipulation. For example, the handling system may include a robotic arm having a proximal end mounted to a base of a carriage (or carriage system) that may travel on ground surfaces, sets of rails, or any other surfaces, as the robotic arm imparts a movement or manipulation onto a vehicle grasped at a distal end.

Moreover, in some embodiments, during a movement or a manipulation, an object such as a vehicle may also be subjected to one or more impacts, factors or effects from sources that may be intrinsic or external to the vehicle or the handling system. For example, during a movement or a manipulation of a vehicle, the vehicle may operate one or motors, control surfaces or other systems as one or more aspects of the movement or manipulation. Alternatively, during a movement or manipulation of a vehicle, the vehicle may be subjected to external excitation such as acoustic energy generated by a speaker or another source of sound across a range of frequencies, or at constant or varying intensities. The frequencies of excitation energy may cover any range, such as from zero hertz to five hundred hertz (0 to 500 Hz), from zero hertz to two thousand hertz (0 to 2000 Hz), or over any other ranges, or any other range, and may be emitted by a speaker or another excitation source in a stepwise fashion, e.g., according to a step function, or according to a delta function or any other function, such that a frequency of the energy being emitted remains constant for a brief period of time before being increased or decreased to another frequency.

A signature (e.g., an inertial or vibratory signature) may take any number of forms in accordance with the present disclosure. For example, a signature may comprise a set or a plot of forces, torques, power levels or energy levels or other attributes or features detected by a sensor of a handling system, with respect to time or frequencies. Moreover, signatures may be compared to one another by matching values of forces, torques, power levels or energy levels or other attributes or features at specific times or frequencies, or intervals or ranges of times or frequencies. Alternatively, signatures may be compared to one another based on shapes or waveforms of their respective sets or plots of forces, torques, power levels or energy levels or other attributes or features.

Figure 2A:
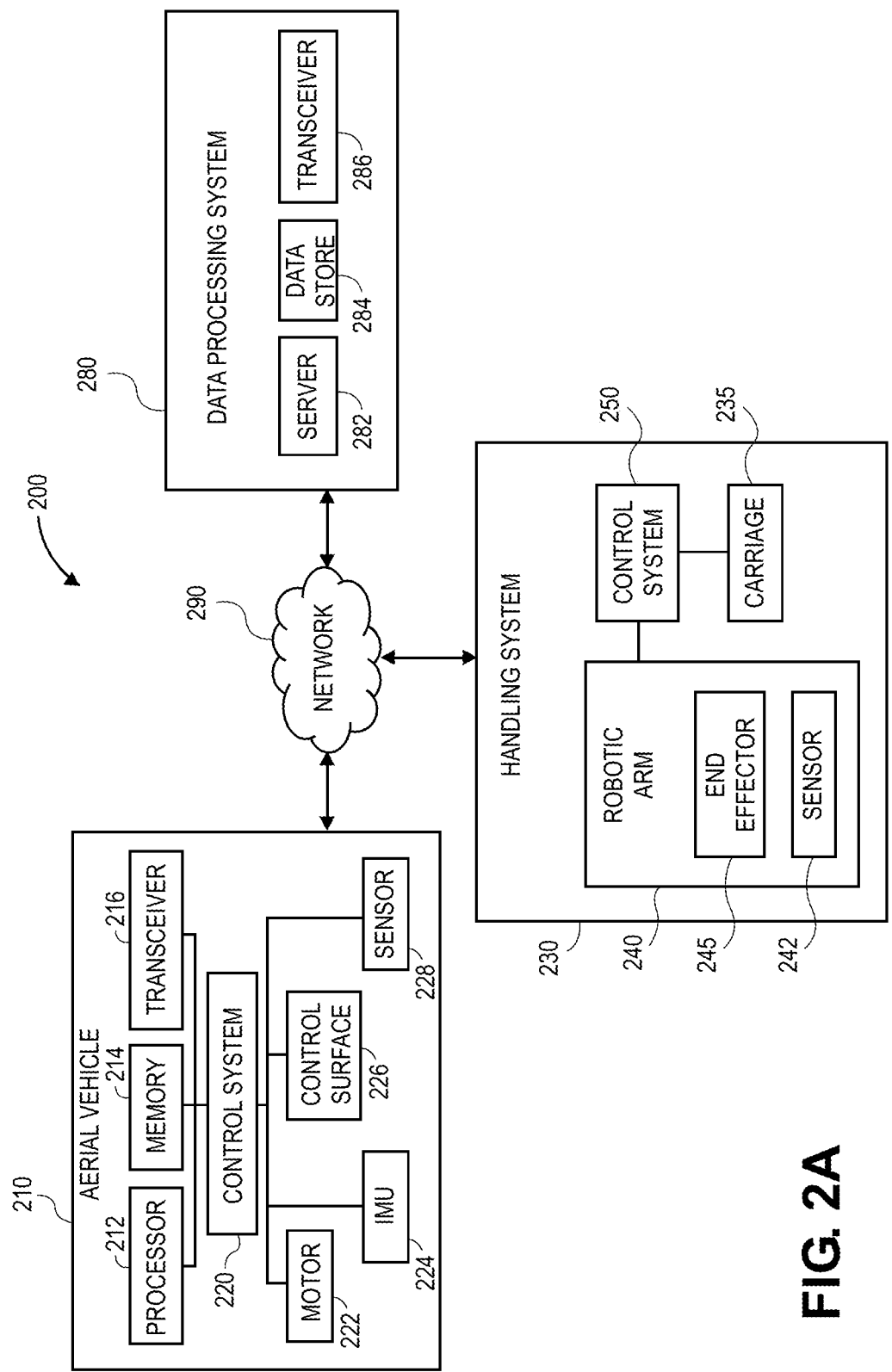
FIGS. 2A and 2B are block diagrams of one system for determining vehicle integrity in accordance with embodiments of the present disclosure.
Figure 2B:
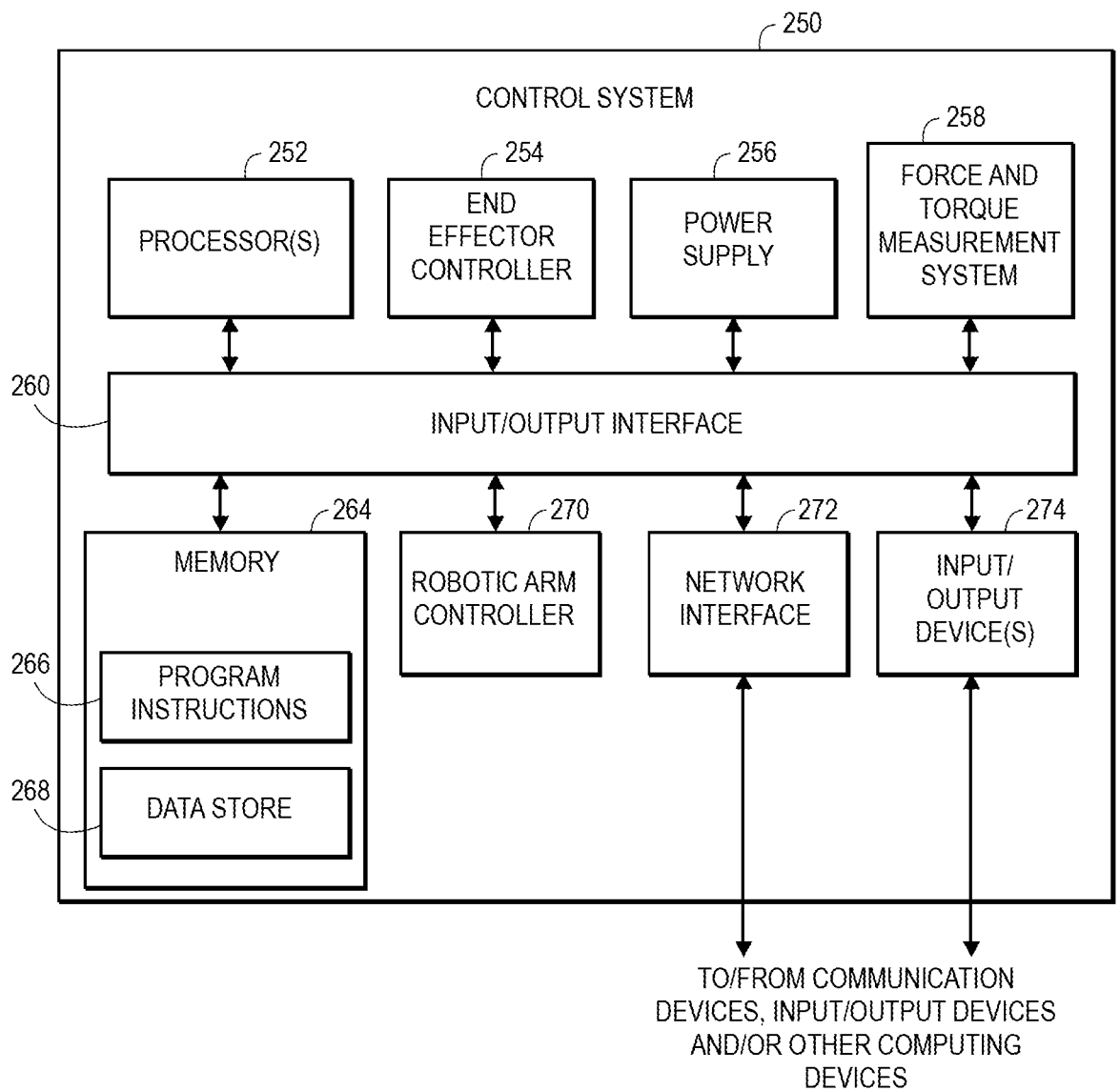

Referring to FIGS. 2A and 2B, block diagrams of components of one system 200 for determining vehicle integrity in accordance with embodiments of the present disclosure is shown. The system 200 of FIGS. 2A and 2B includes an aerial vehicle 210, a handling system 230 and a data processing system 280 connected to one another over a network 290. Except where otherwise noted, reference numerals preceded by the number "2" shown in the block diagrams of FIGS. 2A and 2B indicate components or features that are similar to components or features having reference numerals preceded by the number "1" shown in FIGS. 1A through 1G.

The aerial vehicle 210 includes a processor 212, a memory 214 and a transceiver 216. The aerial vehicle 210 further includes a control system 220, one or more propulsion motors 222, an inertial measurement unit 224, one or more control surfaces 226 and one or more sensors 228.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the motors 222, the inertial measurement unit 224, the control surfaces 226 or the sensors 228.

The processor 212 may also control the operation of one or more control systems or modules, such as the control system 220, for generating instructions for conducting operations of one or more of the propulsion motors 222, the inertial measurement unit 224, or the control surfaces 226, or for interpreting information or data captured by the sensors 228. Such control systems or modules may be associated with one or more other computing devices or machines, and may communicate with the handling system 230, the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/ Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/ output (or "I/O") interfaces, network interfaces and/or input/ output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the motors 222, the inertial measurement unit 224, the control surfaces 226 or the sensors 228, or any other devices or components (not shown). The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the motors 222, the inertial measurement unit 224, the control surfaces 226 or the sensors 228, or other components, such as to cause one or more of the motors 222 to rotate propellers at desired speeds or to cause such propellers to be aligned in selected positions or orientations. The control system 220 may further control any other aspects of the aerial vehicle 210, including but not limited to the operation of one or more aspects of the control surfaces 226, which may include wings, rudders, ailerons, elevators, flaps, brakes, slats or other features within desired ranges, or the enactment with or release of one or more items by one or more engagement systems (not shown). The control system 220 may also interpret data captured or signals generated by the inertial measurement unit 224, or the sensors 228. In some embodiments, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the motors 222 may be a brushless DC multi-phase motor such as an outrunner brushless motor or an inrunner brushless motor.

The aerial vehicle 210 may include any number of motors 222 of any kind. For example, one or more of the motors 222 may be aligned or configured to provide forces of lift to the aerial vehicle 210, exclusively, while one or more of the motors 222 may be aligned or configured to provide forces of thrust to the aerial vehicle 210, exclusively. Alternatively, one or more of the motors 222 may be aligned or configured to provide forces of lift and forces of thrust to the aerial vehicle 210, as needed. For example, the motors 222 may be fixed in their orientation on the aerial vehicle 210, or configured to vary their respective orientations, e.g., a tilt-rotor aircraft. Moreover, the motors 222 may be aligned or configured to operate with different capacities or ratings, or at different speeds, or coupled to propellers having different sizes and shapes. For example, in some embodiments, one or more of the motors 222 may be an electric motor, e.g., a brushless DC multi-phase motor, and one or more of the motors 222 may be a gasoline-powered motor.

Each of the motors 222 may be coupled to one or more propellers (or rotors or rotatable systems) having a plurality of shaped blades joined to a hub or boss. For example, each of such propellers may be rotatably mounted to a mast or shaft associated with a respective one of the motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The inertial measurement unit 224 may be any type or form of onboard device for sensing changes in linear or rotational motion of the aerial vehicle 210. In some embodiments, the inertial measurement unit 224 may include one or more gyroscopes, one or more accelerometers, one or more compasses (or other magnetometer), and a Global Positioning System ("GPS") transceiver. In some embodiments, the inertial measurement unit 224 may be installed onboard the aerial vehicle 210, such as at or near a center of gravity of the aerial vehicle 210, or in another position aboard the aerial vehicle 210, and intended for use during in-flight operations, e.g., in association with an inertial navigation system. In some other embodiments, however, the inertial measurement unit 224 may be strapped or mounted to an object suspended within the aerial vehicle 210.

Gyroscopes of the inertial measurement unit 224 may be any mechanical or electrical device, component, system, or instrument for determining an orientation, e.g., the orientation of the aerial vehicle 210. For example, the gyroscopes may be traditional mechanical gyroscopes, each having at least a pair of gimbals and a flywheel or rotor. Alternatively, the gyroscopes may be electrical components such as dynamically tuned gyroscopes, fiber optic gyroscopes, hemispherical resonator gyroscopes, London moment gyroscopes, microelectromechanical sensor gyroscopes, ring laser gyroscopes, or vibrating structure gyroscopes, or any other type or form of electrical component for determining an orientation of the aerial vehicle 210. In some embodiments, the gyroscopes may generate angular rate data in any direction or along or about any axis.

Accelerometers of the inertial measurement unit 224 may be any mechanical or electrical devices, components, systems, or instruments for sensing or measuring accelerations, including but not limited to devices having one or more potentiometers, linear variable differential transformers, variable reluctance devices or piezoelectric components. For example, in some embodiments, the accelerometers may be configured to capture acceleration data in any direction or along or about any axis, e.g., a triaxial accelerometer. The gyroscopes and/or the accelerometers of the inertial measurement unit 224 may be configured to generate angular rate data or acceleration data, respectively, at any rate or frequency, such as at frequencies ranging from zero to five hundred Hertz (0-500 Hz) or at frequencies greater than five hundred hertz (500 Hz).

Compasses of the inertial measurement unit 224 may be any devices, components, systems, or instruments adapted to determine one or more directions with respect to a frame of reference that is fixed with respect to the surface of the Earth (e.g., a pole thereof). For example, the compasses may include one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like). GPS transceivers may be any devices, components, systems, or instruments adapted to receive signals (e.g., trilateration data or information) relating to a position of the inertial measurement unit 224 from one or more GPS satellites of a GPS network (not shown), or for reporting the position of the inertial measurement unit 224 determined based on such signals. Alternatively, the GPS transceivers may be any devices or components for determining geolocations (e.g., geospatially-referenced points that precisely define an exact location in space with one or more geocodes), such as a set of geographic coordinates, e.g., a latitude and a longitude, and, optionally, an elevation that may be ascertained from signals (e.g., trilateration data or information) or geographic information system (or "GIS") data). Geolocations of the GPS transceivers or the inertial measurement unit 224 may be associated with the aerial vehicle 210, where appropriate.

In some embodiments, the inertial measurement unit 224 may further include any number of computer components, e.g., one or more processors, memory components and/or transceivers (not shown), or any other components for aiding in the determination of accelerations, velocities, positions and/or orientations.

The control surfaces 226 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 226 may include, but are not limited to, wings, rudders, ailerons, elevators, flaps, brakes or slats, or other features. In some embodiments, each of the control surfaces 226 may include a motor, such as an electrical, mechanical and/or hydraulic or other component or actuator for rotating, translating or otherwise repositioning or reorienting a respective one of the control surfaces 226 during operation of the aerial vehicle 210, under the control of the one or more processors 212 or the control system 220. In some embodiments, each of the control surfaces 226 may include a directional sensor, such as any type of sensor or other component that is embedded into one or more aspects of one of the control surfaces 226 (e.g., a leading edge, a trailing edge, a tip or one or more other faces or aspects of such surfaces 226) and configured to gather information or data with respect to an alignment or orientation thereof. For example, one of the control surfaces 226 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction.

The sensors 228 may be any devices, systems or components that are configured to capture data regarding the aerial vehicle 210, or its surroundings, as the aerial vehicle 210 is engaged in operations or testing, or at any other time. In some embodiments, the sensors 228 may include any number of sensors, e.g., a suite of such sensors, of any type or form. For example, the sensors 228 may be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the aerial vehicle 210, for any purpose. For example, the sensors 228 may be configured to capture or detect reflected light if the reflected light is within a field of view of the sensors 228, which is defined as a function of a distance between an imaging sensor and a lens within the sensors 228, viz., a focal length, as well as a position of the sensors 228 and an angular orientation of the lens. Accordingly, where an object appears within a depth of field, or a distance within the field of view where the clarity and focus is sufficiently sharp, the sensors 228 may capture light that is reflected off objects of any kind to a sufficiently high degree of resolution using one or more sensors thereof, and store information regarding the reflected light in one or more data files.

The sensors 228 may also include manual or automatic features for modifying a field of view or orientation. For example, the sensors 228 may be a digital camera configured in a fixed position, or with a fixed focal length (e.g., fixed-focus lenses) or angular orientation. Alternatively, the sensors 228 may include one or more actuated or motorized features for adjusting a position of the sensors 228, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensors 228, or a change in one or more of the angles defining the angular orientation of the sensors 228.

For example, the sensors 228 may be an imaging device that is hard-mounted to the aerial vehicle 210 in a fixed configuration or angle with respect to one, two or three axes. Alternatively, however, the sensors 228 may be provided with one or more motors and/or controllers for manually or automatically operating one or more of the components, or for reorienting the axis or direction of the sensors 228, i.e., by panning or tilting the sensors 228. Panning the sensors 228 may cause a rotation within a horizontal plane or about a vertical axis (e.g., a yaw), while tilting the sensors 228 may cause a rotation within a vertical plane or about a horizontal axis (e.g., a pitch). Additionally, the sensors 228 may be rolled, or rotated about its axis of rotation, and within a plane that is perpendicular to the axis of rotation and substantially parallel to a field of view of the sensors 228.

Imaging data (e.g., still or moving images, as well as associated audio data or metadata) captured using the sensors 228 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensors 228 may further be or include one or more sound sensors (e.g., microphones, piezoelectric sensors, vibration sensors or other transducers for detecting and recording acoustic energy from one or more directions), speedometers, inclinometers, thermometers, barometers, hygrometers, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), ranging sensors (e.g., radar, sonar or LIDAR ranging sensors) or others.

The sensors 228 may be further configured to capture, record and/or analyze information or data regarding the aerial vehicle 210, and to analyze such data or information by one or more means, e.g., by aggregating or summing such information or data to form one or more qualitative or quantitative metrics associated with the motion of the aerial vehicle 210. For example, a net vector indicative of any and all relevant movements of the aerial vehicle 210, including but not limited to physical accelerations, velocities, positions or orientations of the sensors 228, may be derived, and the net vector may include any other values associated with information or data captured by any of the sensors 228, e.g., images, sounds, or the like. Additionally, coefficients or scalars indicative of the relative movements of the aerial vehicle 210 may also be defined.

Although the aerial vehicle 210 shown in the block diagram of FIG. 2A includes a single box for a motor 222, a single box for an inertial measurement unit 224, a single box for a control surface 226, and a single box for a sensor 228, those of ordinary skill in the pertinent arts will recognize that any number or type of motors, inertial measurement units (or components thereof), control surfaces or sensors may be provided aboard the aerial vehicle 210 in accordance with the present disclosure. Alternatively, in some embodiments, the aerial vehicle 210 may be a ground vehicle or any other object. The systems and methods of the present disclosure are not limited for use in connection with aerial vehicles.

The handling system 230 is any system that is configured to grasp and manipulate one or more objects, such as by causing the objects to perform one or more maneuvers or movements. As is shown in FIG. 2A, the handling system 230 includes a carriage (or carriage portion) 235, a robotic arm 240 and a control system 250, which may be mounted or coupled to one another in any manner or fashion.

The robotic arm 240 includes any number of sensors 242 and an end effector 245, which may be disposed at a distal end of the robotic arm 240. The robotic arm 240 may include any number of articulating pivots or other components and any number of motors for providing for multiple degrees of freedom of movement along or about one or more axes, such as six degrees of freedom for translation or rotation along or about an x-axis, ay-axis and a z-axis.

The robotic arm 240 further includes the end effector 245, which may be configured to receive and/or mate with one or more contact points of the aerial vehicle 210 or any other object. With an object, such as the aerial vehicle 210, engaged thereby, the robotic arm 240 may cause the aerial vehicle to undergo one or more maneuvers or manipulations by executing defined protocols and/or predetermined sequences of motion. Information or data captured by the sensors 242 may be processed to determine specific force and torque measurements or inertial parameters of the object (e.g., masses, weights, centers of gravity, moments of inertia, or other inertial or vibratory parameters), and/or to otherwise diagnose or assess the aerial vehicle 210.

For example, in some embodiments, after engaging the aerial vehicle 210, the robotic arm may rotate the aerial vehicle 210 by predetermined angular increments about an x-axis (e.g., 5 degrees, 10 degrees, 15 degrees, 45 degrees, 90 degrees, 180 degrees, 360 degrees, or others), before rotating the aerial vehicle 210 about ay-axis, and about a z-axis, by the same predetermined angular increments, or different angular increments. Alternatively, or additionally, the aerial vehicle 210 may be translated by a predetermined distance along the x-axis (e.g., one meter, two meters, five meters, or others), then translated along the y-axis, and along the z-axis, by the same predetermined distance, or different distances. In some embodiments, the aerial vehicle 210 may also be excited by an external source (e.g., an acoustic excitation source, such as a speaker) independently or during the performance of one or more maneuvers or other manipulations, and the sensors 242 may capture information or data regarding the inertial or vibratory response of the aerial vehicle 210 during the excitation or the maneuvers or other manipulations.

The sensors 242 may be coupled to the end effector 245 or otherwise distributed throughout the robotic arm 240, e.g., at locations of one or more of articulating pivots, and programmed or configured to capture any type or form of information or data regarding an inertial or vibratory effect or response of the aerial vehicle 210 (or other object) in response to one or more maneuvers or other manipulations. In some embodiments, the sensors 242 may be rigidly coupled to the end effector 245 at a wrist joint of the robotic arm 240. Alternatively, in some embodiments, the sensors 242 may be positioned at any point along the robotic arm 240, e.g., adjacent to one or more of the articulating pivots or at any point between a base of the robotic arm 240 and the end effector 245. Furthermore, in some embodiments, multiple sensors 242 may be provided and distributed at various locations along the robotic arm 240 or the end effector 245, and information or data captured by such sensors 242 can be aggregated and combined in determining overall inertial or vibratory responses or effects on the aerial vehicle 210.

In some embodiments, the sensors 242 may include one or more load cells that are configured to measure a force and/or a torque imparted upon the robotic arm 240 during or after one or more maneuvers or other manipulations of the aerial vehicle 210. For example, the sensors 242 may be any type or form of load cell, e.g., an electric load cell, a hydraulic load cell, a pneumatic load cell, a strain-gage load cell, a piezoresistive load cell, an inductive load cell, or any other sensor or detector of forces or torques. In some embodiments, the sensors 242 may be configured to capture information or data regarding forces and torques exerted on the end effector 245 in any number of degrees of freedom of movement. For example, the sensors 242 can also measure forces and torques exerted on the end effector 245 as the end effector 245 engages the aerial vehicle 210, and during or after the robotic arm 240 subjects the aerial vehicle 210 to one or more maneuvers or other manipulations. Information or data captured by the sensors 242 upon an initial engagement of the aerial vehicle 210 may be processed to determine whether an alignment of end effector 245 is correct, whether the aerial vehicle 210 rests stably on a surface from which it is being engaged, whether a payload associated with the aerial vehicle 210 was delivered, or to make any other determinations.

Alternatively, or in addition to load cells, the sensors 242 may further include any number of other sensors, including proximity sensors, imaging devices (e.g., cameras), laser sensors (e.g., LIDAR), thermal sensors, radar, accelerometers, gyroscopes, radio-frequency identification (RFID) sensors, and the like. For example, the sensors 242 may include one or more laser sensors or range finders directed at a skin or other external surface of the aerial vehicle 210 and monitor changes in ranges or distances to the aerial vehicle 210 during or after a maneuver or other manipulation of the aerial vehicle 210. Such changes may be processed in order to determine inertial or vibratory effects of the maneuver or other manipulation on the aerial vehicle 210. Likewise, the sensors 242 may include one or more imaging devices aligned to include surfaces of the aerial vehicle 210 within one or more fields of view. Information or data regarding forces or torques that is captured while or after the robotic arm 240 manipulates the aerial vehicle 210 may be processed to determine various information regarding the aerial vehicle 210, including but not limited to inertial or vibratory properties or parameters associated with the aerial vehicle (e.g., as mass, weight, moment of inertia, center of gravity, etc.).

The end effector 245 may include one or more components that are specifically configured to mate with one or more contact points (or sets of contact points) provided on an external surface of the aerial vehicle 210 or another object. The end effector 245 may be provided at or near a pivot or joint at a distal end of the robotic arm 240, and may include one or more arms or other engagement members that may be received by and may mate with contact points provided on the aerial vehicle 210. The arms or other engagement members of the end effector 245 may remain fixed or be repositioned with respect to one another, e.g., between open and closed positions, through the use of one or more motors (e.g., servomotor, stepper motors or the like), actuators (e.g., linear actuators, rotary actuators or others), pneumatics, worm screw arrangements, hydraulics, linkages, gears, belts, or various other configurations or arrangements, in order to cause the respective arms or engagement members to move between open and closed positions.

The robotic arm 240 may be mounted to the carriage 235 (or carriage system), which may include one or more sets of wheels or other rolling systems that enable the robotic arm 240 to travel in one or more directions on various surfaces. The carriage 235 may be configured to travel on substantially flat surfaces, or on a track having one or more sets of rails. The carriage 235 may include a base to which the robotic arm 240 is mounted, and one or more motors and power sources for causing one or more wheels to rotate at selected speeds and in selected directions. The carriage 235 may further include one or more processors, transceivers or other systems for transmitting and receiving information or data such as locations, speeds, or poses of the robotic arm 240 or the aerial vehicle 210, or any other information or data.

Alternatively, in some embodiments, the handling system 230 may include a base or other structure to which the robotic arm 240 is mounted that is fixed in position. The handling system 230 need not include the carriage 235 or any other mobile systems.

The control system 250 may be programmed or configured to control the operation of the handling system 230, including but not limited to the engagement, movement or manipulation of objects, e.g., the aerial vehicle 210, by the robotic arm 240, or communication with one or more external computer systems, including but not limited to computer systems provided aboard the aerial vehicle 210, to the data processing system 280, or to any other external systems (not shown). As is shown in FIG. 2B, the control system 250 may include one or more processors 252, coupled to a memory 264, e.g., a non-transitory computer readable storage medium, via an input/output (I/O) interface 260. The control system 250 may further include end effector controllers 254, such as motor controllers, along with one or more power modules 256, a force and torque measurement system 258, and/or a robotic arm controller 270. The control system 250 further includes a network interface 272, and one or more input/output devices 274.

In various implementations, the control system 250 may be a uniprocessor system including one processor 252, or a multiprocessor system including several processors 252 (e.g., two, four, eight, or another suitable number). The processors 252 may be any suitable processor capable of executing instructions. For example, in various implementations, the processors 252 may be general-purpose or embedded processors implementing any of a variety of instruction set architectures (ISAs), such as the x86, PowerPC, SPARC, or MIPS ISAs, or any other suitable ISA. In multiprocessor systems, processors 252 may commonly, but need not necessarily, implement the same ISA.

The memory 264 may be configured to store executable instructions, e.g., program instructions 266, as well as data, manipulation instructions, predetermined protocols and/or sequenced movements, aerial vehicle types, and/or data items accessible by the processors 252 in one or more data stores 268. In some embodiments, the memory 264 may be implemented using any suitable memory or storage technology, such as static random-access memory (SRAM), synchronous dynamic RAM (SDRAM), nonvolatile/Flash-type memory, or any other type of memory. In some implementations, program instructions and/or other information or data may be received, sent, or stored upon different types of computer-accessible media, such as non-transitory media, or on similar media separate from the memory 264 or the control system 250. Generally speaking, a non-transitory, computer readable storage medium may include storage media or memory media such as magnetic or optical media, e.g., disk or CD/DVD-ROM, coupled to the control system 250 via the input/output interface 260. Information or data may be transmitted by transmission media or signals such as electrical, electromagnetic, or digital signals, which may be conveyed via a communication medium such as a network and/or a wireless link, such as may be implemented via the network interface 272.

In some embodiments, the input/output interface 260 may be configured to coordinate input/output traffic between the processors 252, the memory 264, and any peripheral devices, the network interface or other peripheral interfaces, such as input/output devices 274. In some embodiments, the input/output interface 260 may perform any necessary protocol, timing or other data transformations to convert data signals from one component (e.g., the memory 264) into a format suitable for use by another component (e.g., processors 252). In some implementations, the input/output interface 260 may include support for devices attached through various types of peripheral buses, such as a variant of the Peripheral Component Interconnect (PCI) bus standard or the Universal Serial Bus (USB) standard, for example. In some implementations, the function of the input/output interface 260 may be split into two or more separate components, such as a north bridge and a south bridge, for example. Also, in some implementations, some or all of the functionality of the input/output interface 260, such as an interface to the memory 264, may be incorporated directly into the processors 252.

The end effector controller 254 and robotic arm controller 270 may include sensors that can be used to manipulate, orient, and position the robotic arm 240 and/or the end effector 245. The end effector controller 254 and robotic arm controller 270 can communicate with the actuator(s) or motor(s) (e.g., a servo motor) used to manipulate, engage, and/or disengage the aerial vehicle 210 or any other objects. The end effector controller 254 and robotic arm controller 270 may also communicate with the handling system 230 and/or the robotic arm 240 to adjust the manipulation, orientation, or other parameters of the pivots and/or motors to facilitate operation of the end effector 245, e.g., to engage with or to disengage from one or more objects, such as the aerial vehicle 210.

The network interface 272 may be configured to allow data to be exchanged between the control system 250, or other devices attached to a network, e.g., the network 290, such as other computer systems (e.g., remote computing resources) or control systems of other handling systems or aerial vehicles. The input/output devices 274 may, in some embodiments, include one or more of the sensors 242. Multiple input/output devices 274 may be present and controlled by the control system 250.

In some embodiments, the control system 250 may execute one or more control loops to maintain the operation of the handling system 230 with an object, such as the aerial vehicle 210, engaged by the robotic arm 240. For example, the control system 250 can provide certain information or data to the robotic arm 240, including but not limited to instructions or commands for causing the robotic arm 240 and an object (e.g., the aerial vehicle 210) engaged thereby to perform one or more maneuvers or other manipulations. Likewise, information or data captured by the sensors 242 during such maneuvers or manipulations may be provided to the control system, which may monitor forces, torques or other values representative of the inertial or vibratory responses to such maneuvers or manipulations.

As is shown in FIG. 2A, the data processing system 280 includes one or more physical computer servers 282 having one or more data stores 284 and one or more transceivers 286 associated therewith, and may be provided for any specific or general purpose. For example, the data processing system 280 of FIG. 2A may be independently provided for the exclusive purpose of receiving, analyzing or storing information or data received from the aerial vehicle 210 or the handling system 230, including but not limited to forces, torques, frequencies, power levels, times and/or other sets of data regarding the inertial or vibratory response to one or more maneuvers or other manipulations. Alternatively, the data processing system 280 of FIG. 2A may be provided in connection with one or more physical or virtual services configured to receive, analyze or store such information or data, as well as one or more other functions.

In some embodiments, the data processing system 280 may be configured to program the handling system 230 to engage with the aerial vehicle 210 or another object, and to subject the aerial vehicle 210 or other object to one or more maneuvers or other manipulations. In some embodiments, the data processing system 280 may be configured to program the one or more sensors 242 to sense forces or torques imparted upon the robotic arm by an object (e.g., the aerial vehicle 210), determine distances or ranges to the object, or capture images of the object being subjected to one or more maneuvers or otherwise manipulated by the robotic arm 240. In some embodiments, the data processing system 280 may be configured to process images captured by the sensors 242, e.g., according to one or more optical flow methods or techniques, or according to a steerable filter-based method, to detect low levels of vibration or other motion of such objects within the images, and to generate power levels or energy levels associated with the motion. In still other embodiments, the data processing system 280 may be configured to associate power levels or energy levels of vibration with frequencies of excitation, or to identify one or more natural frequencies of vibration based on local or absolute maximum levels of power or energy. The data processing system 280 may be further configured to generate one or more signatures representative of an inertial or vibratory response to maneuvers or other manipulations based on power levels or energy levels and corresponding frequencies of vibration, or to compare one signature to another signature on any basis.

The servers 282 may be connected to or otherwise communicate with the data stores 284 and the transceiver 286. The data stores 284 may store any type of information or data, including but not limited to information or data received from the aerial vehicle 210 or the handling system 230, for any purpose. The transceiver 286 may share any of the features, properties or attributes of the transceiver 216 described above, or may have one or more different features, properties or attributes. The servers 282 and/or the transceiver 286 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the handling system 230 or the data processing system 280 may use any web-enabled or Internet applications or features, or any other client-server applications or features including E-mail or other messaging techniques, to connect to the network 290, or to communicate with one another. For example, the aerial vehicle 210 and/or the handling system 230 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210, the handling system 230 or the data processing system 280 may operate, include or be associated with any of a number of computing devices that are capable of communicating over the network 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the control system 250 or the server 282, or any other computers or control systems utilized by the aerial vehicle 210, the handling system 230 or the data processing system 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, an object, such as a vehicle (e.g., a UAV, or a drone) may be grasped by a handling system and moved or manipulated in a predetermined manner that results in a change in a position, an orientation, a velocity or an acceleration of the object. Sensors associated with the handling system may capture data regarding the behavior of the object during the manipulation. The captured data may be processed according to one or more algorithms or techniques in order to generate a signature representative of the forces, torques, power levels or energy levels or other attributes or features of the object sensed during the movement or manipulation and stored in association with the vehicle in one or more data stores.

Figure 3:
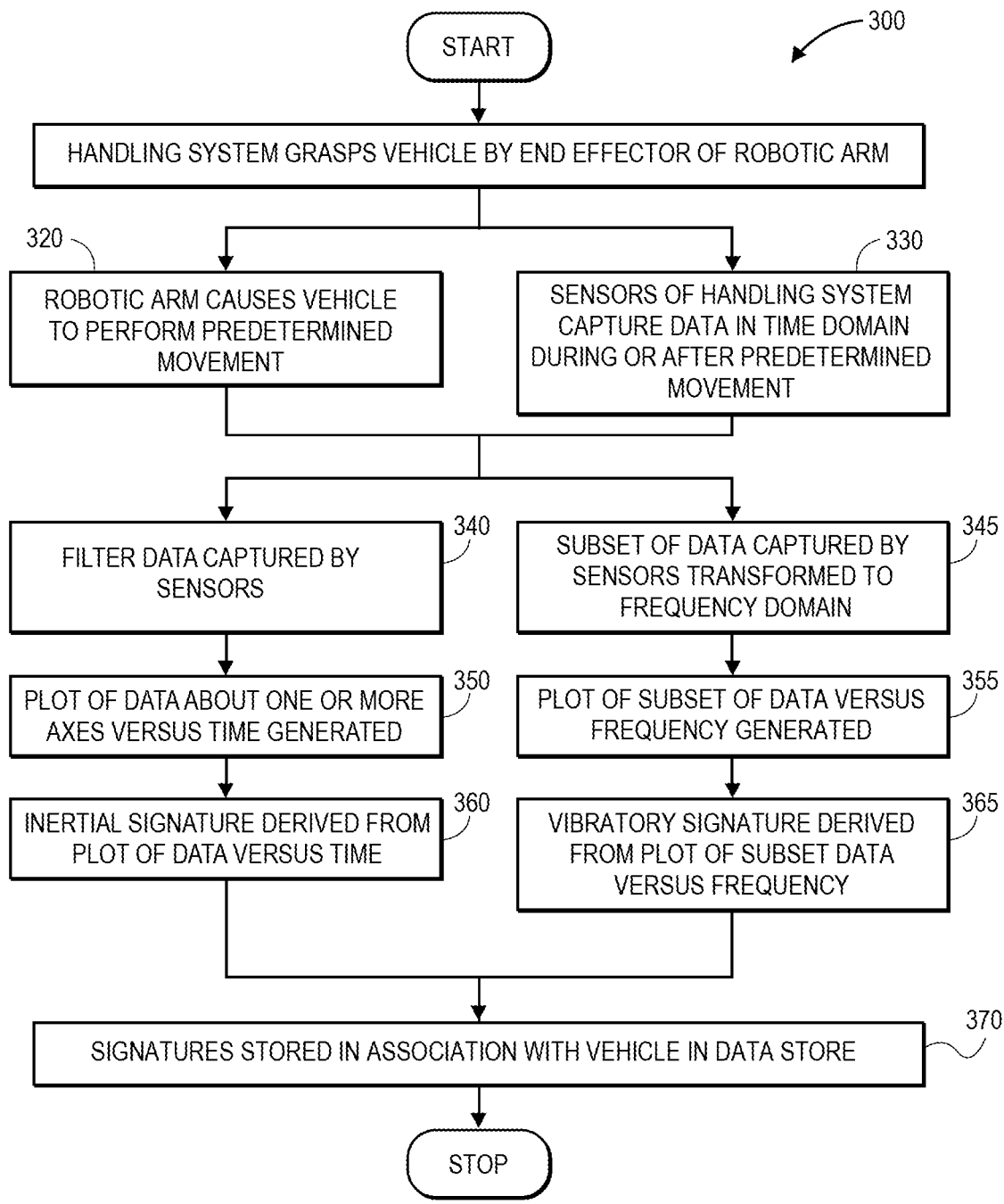
FIG. 3 is a flow chart of one process for determining vehicle integrity in accordance with embodiments of the present disclosure.

Referring to FIG. 3, a flow chart 300 of one process for determining vehicle integrity in accordance with embodiments of the present disclosure is shown. At box 310, a handling system grasps a vehicle by an end effector at a distal end or terminus of a robotic arm. For example, the end effector may include one or more arms that are adapted or configured to move with respect to one another, and include engagement members that are adapted to mate with corresponding openings or other features of the vehicle in a firm, secure manner. The robotic arm may include any number of articulating pivots or other features that enable the robotic arm to operate with one or more degrees of freedom of motion, e.g., to translate or rotate along or about an x-axis, ay-axis and a z-axis, or any other axes. In some embodiments, the handling system may be fixed in position, with the robotic arm mounted to a base or other aspect of the handling system in a manner that permits the robotic arm to rotate about one or more axes. In some other embodiments, the handling system may be mobile in nature, and the robotic arm may be mounted to a base or other aspect of the handling system provided on a carriage that is configured to travel on one or more ground surfaces, sets of rails or other features. The vehicle may be any type or form of vehicle, including but not limited to an aerial vehicle, a ground vehicle (e.g., an autonomous ground vehicle, a robot, an automobile), or any other powered or human-powered vehicle. Alternatively, instead of a vehicle, the handling system may grasp any other type or form of object.

At box 320, the robotic arm causes the vehicle to perform a predetermined movement. For example, the robotic arm may manipulate or otherwise cause one or more changes in a position of the vehicle, an orientation of the vehicle, a velocity of the vehicle, or an acceleration of the vehicle. The robotic arm may be configured to raise, lower, translate or rotate the vehicle in any direction and along or about any axis, such as by lifting the vehicle from a ground surface or other location and moving the vehicle to a different ground surface or a different location. In some embodiments, the robotic arm may be mounted to a carriage or other system that is configured to travel in one or more directions as the robotic arm causes the vehicle to perform the predetermined movement.

In parallel, at box 330, one or more sensors of the handling system captures data over time during the performance of the predetermined movement, or thereafter, in a time domain. For example, the robotic arm may include one or more load cells or other sensors for determining a force or a torque applied to the robotic arm by the vehicle during or after the predetermined movement. Alternatively, the robotic arm may further include one or more sensors for determining power levels or energy levels of vibration of one or more surfaces of the vehicle during or after the predetermined movement.

At box 340, the data captured by the sensors at box 330 during or after the predetermined movement is filtered.

At box 350, a plot of the data captured at box 330 about one or more axes is generated with respect to time. For example, where the sensors that captured the data are force sensors or torque sensors configured to capture data regarding forces or torques imparted on the robotic arm about one or more axes during or after the predetermined movement, the data may be plotted with respect to time. The plot may represent forces or torques about any or all of such axes over periods of time that include the performance of the predetermined maneuver, or that follow the performance of the predetermined maneuver. Alternatively, in some embodiments, the data captured by the sensors at box 330 need not be filtered prior to plotting the data.

At box 360, an inertial signature is derived from the plot of data generated at box 350. For example, the inertial signature may be a set of data, or the plot of the data, identifying one or more times at which specific forces, torques, or power or energy levels were observed during or after the movement. In some embodiments, the inertial signature may include one or more absolute or local maximum levels of force, torque, power or energy and times corresponding to such levels. Alternatively, the inertial signature may include not only discrete levels of force, torque, power or energy and times corresponding to such levels but also slopes or derivatives of forces, torques, power or energy levels at such times.

In parallel, at box 345, a subset of the data captured by the sensors at box 330 during the performance of the predetermined maneuver at box 320 is transformed to a frequency domain. For example, where the data represents forces or torques sensed by the sensors, or power levels or energy levels of vibration sensed by the sensors, the data may be transformed into a frequency domain, e.g., by a fast Fourier transform, that represents the forces, torques, power levels or energy levels with respect to frequency of the vehicle.

At box 355, a plot of at least the subset of the data transformed to the frequency domain at box 345 is generated with respect to frequency, and at box 365, a signature (e.g., an inertial or vibratory signature) for the vehicle is derived from the plot of data generated at box 355. For example, as with the inertial signature generated at box 360, the vibratory signature may be a set of data, or the plot of the data, one that identifies one or more frequencies at which specific forces, torques, or power or energy levels of vibration were observed during or after the movement. In some embodiments, the vibratory signature may include one or more absolute or local maximum levels of force, torque, power or energy of vibration and frequencies corresponding to such levels. Alternatively, the vibratory signature may include not only discrete levels of force, torque, power or energy of vibration and frequencies corresponding to such levels but also slopes or derivatives of forces, torques, power or energy levels with respect to such frequencies. Furthermore, in some embodiments, the vibratory signature may be smoothed, such as by using a linear filter across a sliding window of frequencies according to any number of weights, or in any other manner.

At box 370, the signatures derived at box 360 and box 365 are stored in association with the vehicle in a data store, and the process ends. Where the vehicle is known to be in a structurally and aerodynamically sound condition when the predetermined maneuver was performed at box 320, the inertial signature and the vibratory signature may be stored as baseline signatures for the vehicle, or for other vehicles of a common design, class or fleet with the vehicle. Alternatively, the inertial signature and the vibratory signature may be compared to baseline signatures or other signatures previously derived for the vehicle. Those of ordinary skill in the pertinent arts will recognize that the process depicted in the flow chart 300 of FIG. 3 may be used to derive both an inertial signature and a vibratory signature for an object, such as a vehicle, and to store such signatures in association with the vehicle in one or more data stores, or, alternatively, to derive only one of an inertial signature or a vibratory signature for the object in accordance with embodiments of the present disclosure.

A signature derived for a first vehicle in an unknown condition or state as the first vehicle is subjected to one or more predetermined maneuvers may be compared to a signature derived for the first vehicle, or for a second vehicle that is substantially similar or identical to the first vehicle (e.g., where the second vehicle and the first vehicle are members of a common class of vehicles), in a condition or state that is confirmed to be in a compliant or satisfactory state as that vehicle is subjected to the same predetermined maneuvers. To the extent that the signatures are identical or sufficiently similar to one another, the first vehicle may be determined to be of sound integrity, and cleared to perform one or more missions.

Figure 4:
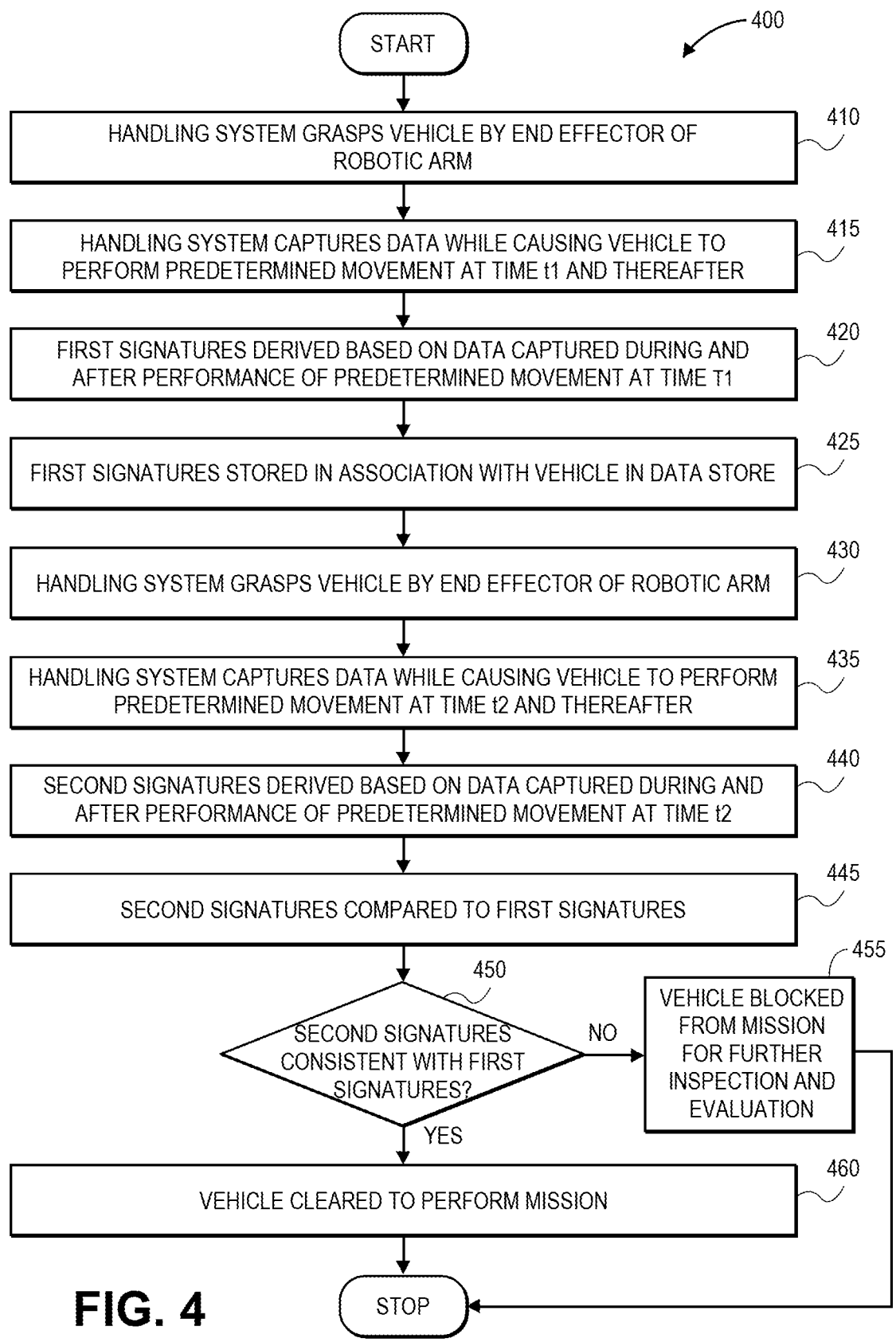
FIG. 4 is a flow chart of one process for determining vehicle integrity in accordance with embodiments of the present disclosure.

Referring to FIG. 4, a flow chart 400 of one process for determining vehicle integrity in accordance with embodiments of the present disclosure is shown. At box 410, a handling system grasps a vehicle by an end effector of a robotic arm. For example, as is discussed above, the end effector may include one or more grasping elements that are configured to mate with one or more contact points of the vehicle.

At box 415, the handling system captures data while causing the vehicle to perform a predetermined movement at a time $t_1$ and thereafter. As is discussed above, the predetermined movement may include one or more sequences of actions that cause a change in a position, an orientation, a velocity or an acceleration of the vehicle. The data may indicate one or more forces, torques, power or energy levels of vibration, or any other data representative of the inertial or vibratory response of the vehicle to the predetermined movement. In some embodiments, the time $t_1$ may correspond to an initial evaluation of the vehicle, or follow a completion of one or more missions. In some other embodiments, the time $t_1$ may follow the completion of maintenance, inspections or repairs to the vehicle. In still other embodiments, the time $t_1$ may correspond to a regularly scheduled or periodic evaluation of the vehicle.

At box 420, first signatures are derived based on the data captured at box 415 during or after the performance of the predetermined movement at the time $t_1$. For example, as is discussed above, the data captured at box 415 may be plotted with respect to time, or transformed into a frequency domain, e.g., by a fast Fourier transform, and plotted with respect to frequency. In some embodiments, the first signatures derived at box 420 may act as baseline signatures for the vehicle, or for other vehicles of a common design, class or fleet. At box 425, the first signatures are stored in association with the vehicle in a data store.

At box 430, the handling system grasps a vehicle by the end effector of the robotic arm. In some embodiments, the vehicle grasped by the handling system may be the same vehicle that was also grasped at box 410, and which was caused to perform the predetermined movement at the time $t_1$, at box 415. In some other embodiments, the vehicle may be a different vehicle than the vehicle that was grasped at box 410, and caused to perform the predetermined movement at the time $t_1$, at box 415. For example, the vehicles grasped by the handling system at box 410 may be different from the vehicle grasped by the handling system at box 430, such as where the vehicles are members of a common class of vehicles, or share one or more identical or substantially identical properties or characteristics.

At box 435, the handling system captures data while causing the vehicle to perform the predetermined movement at a time $t_2$. The predetermined movement imparted upon the vehicle at box 435 may be the same predetermined movement imparted upon the vehicle at box 415, or, alternatively, may include one or more steps (e.g., changes in position, orientation, velocity or acceleration) that are different from the predetermined movement imparted upon the vehicle at box 415.

Additionally, in some embodiments, the time $t_2$ may follow the performance of one or more missions by the vehicle, or precede the performance of one or more missions by the vehicle. Alternatively, in some embodiments, the time $t_2$ may be selected on a regular basis, e.g., in accordance with a schedule or procedure for maintenance or inspections, or at random or on any other basis.

At box 440, second signatures are derived based on the data captured at box 435 during the performance of the predetermined movement at the time $t_2$. For example, the second signatures may be derived in the same manner as the first signatures at box 420, such as by plotting the data captured at box 435 with respect to time, or by transforming the data captured at box 435 into a frequency domain, e.g., by a fast Fourier transform, and plotting the data with respect to frequency, or in any other manner.

At box 445, the second signatures derived at box 440 are compared to the first signatures derived at box 420. For example, one or more representative values of forces, torques, power or energy levels of vibration at discrete times or frequencies of the first signatures may be compared to corresponding values of forces, torques, power or energy levels of vibration at the same times or frequencies of the second signatures. The values may be local or absolute maximum values of the forces, torques, power or energy levels, or any other values, e.g., values at selected frequency intervals. Alternatively, in some embodiments, shapes or waveforms of the first signatures may be compared to shapes or waveforms of the second signatures.

At box 450, whether the second signatures are consistent with the first signatures is determined, e.g., with respect to one or more tolerances or limits. For example, whether the local or absolute maximum values of the forces, torques, power or energy levels of the first signatures and the second signatures or the times or frequencies at which such values are observed are sufficiently similar to one another may be determined subject to the one or more tolerances or limits. Alternatively, whether any other aspect of the second signatures and any corresponding aspect of the first signatures are sufficiently similar to one another may be determined.

If the second signatures are not consistent with the first signatures, then the process advances to box 455, where the vehicle is blocked from performing one or more missions, and subjected to further inspection and evaluation, and the process ends. For example, an inconsistency or dissimilarity between the second signatures and the first signatures implies that the vehicle was in a different level of structural or aerodynamic soundness, or a different level of integrity, at time $t_2$ than at time $t_1$. To the extent that the vehicle was determined to be structurally or aerodynamically sound or at a sufficiently high level of integrity at time $t_1$, the vehicle may require maintenance, inspections or repairs to assess or address its condition at time $t_2$. The maintenance, inspections or repair may be physical in nature and as detailed as is required in order to determine a cause of the inconsistency or dissimilarity between the signatures. In some embodiments, upon completing the maintenance, the inspections and/or the repairs, the vehicle may be grasped again by the robotic arm, and caused to perform the predetermined movement again. Data captured during the performance of the predetermined movement may be processed to derive another inertial or vibratory signature, which may be compared to the first signatures derived at box 420, in order to determine whether the maintenance, the inspections or the repairs were successful, and whether the vehicle may be cleared to perform one or more missions.

If the second signatures are consistent with the first signatures, however, then the process advances to box 460, where the vehicle is cleared to perform one or more missions, and the process ends. For example, the consistency or similarity between the second signatures and the first signatures implies that the vehicle was structurally and aerodynamically sound at time $t_2$, and presumed to be capable of performing such missions.

Figure 5A:
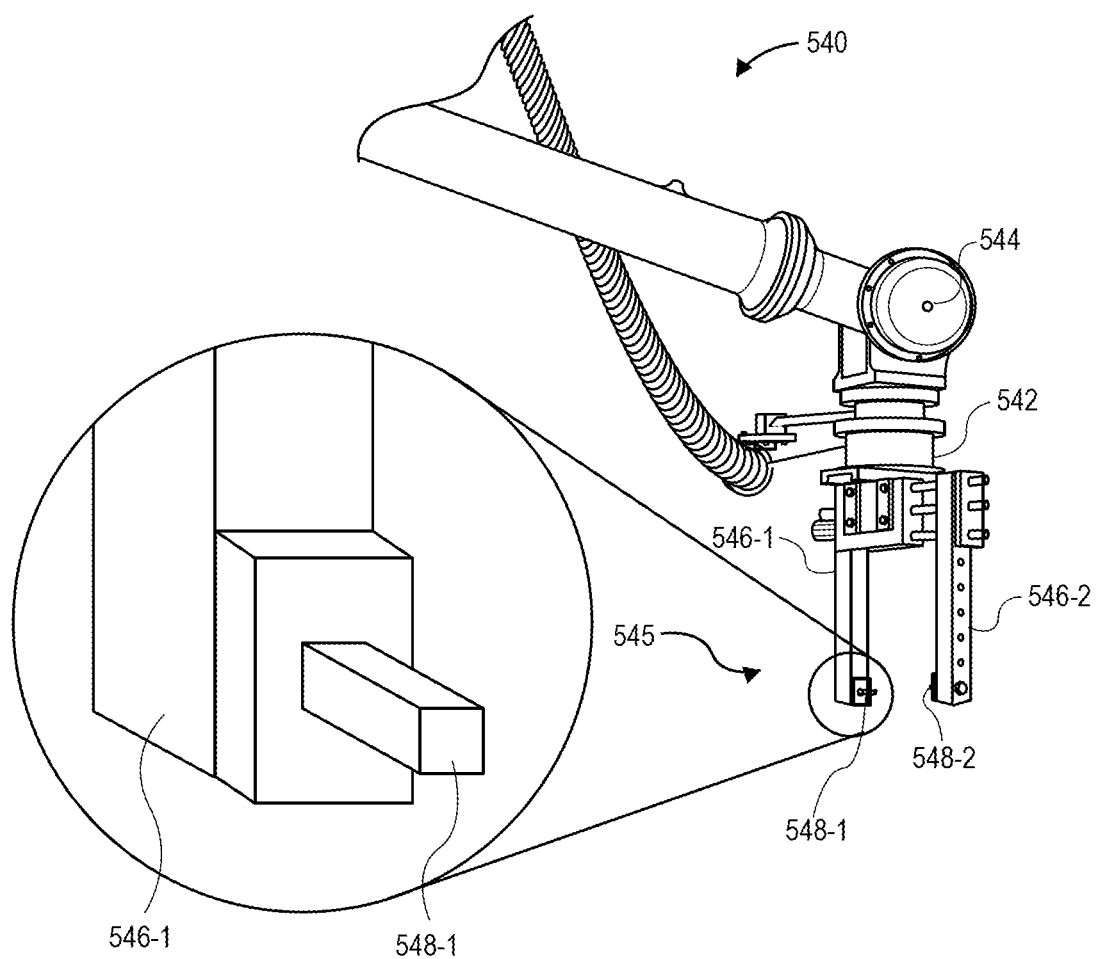
FIGS. 5A through 5C are views of aspects of one system for determining vehicle integrity in accordance with embodiments of the present disclosure.
Figure 5B:
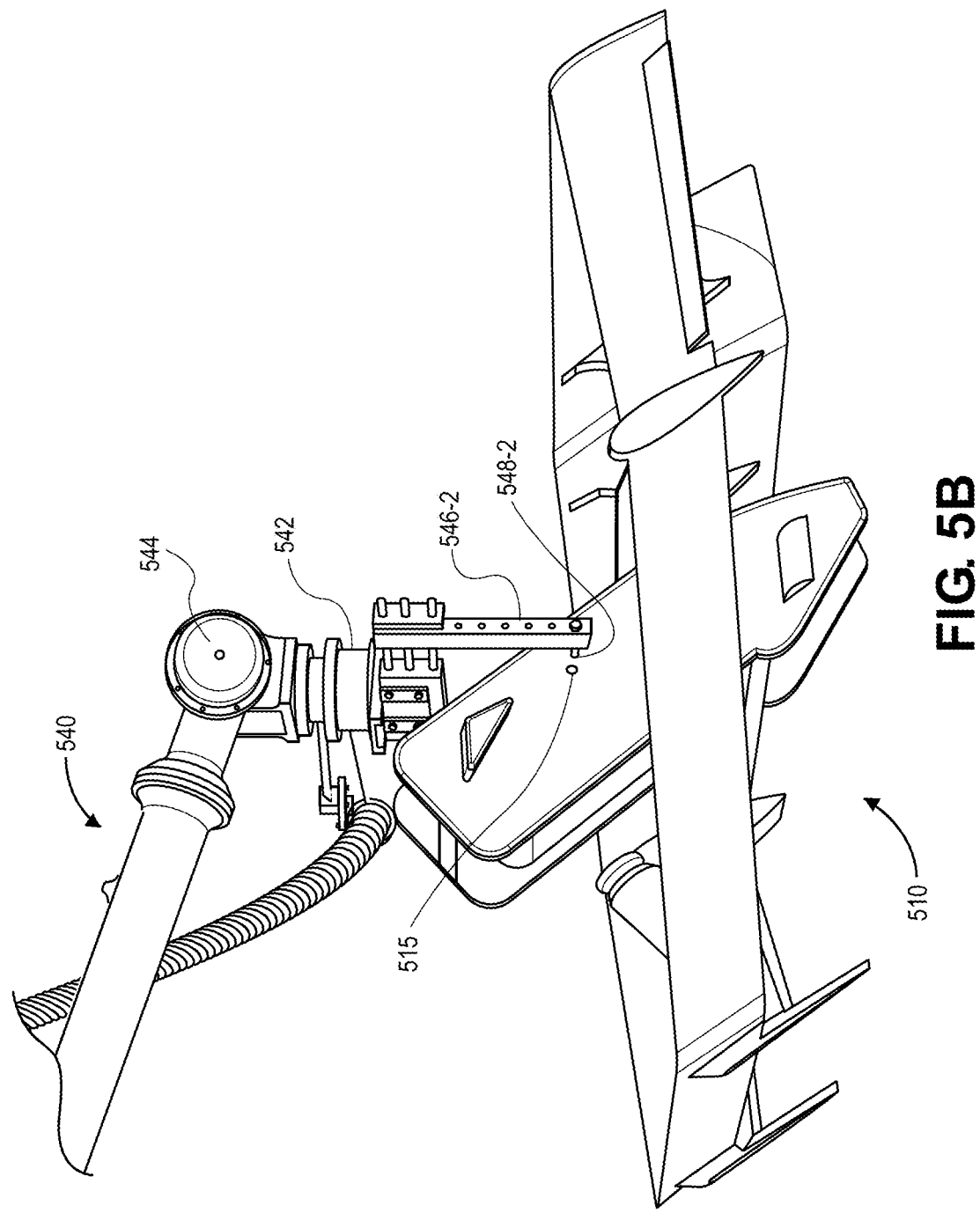
Figure 5C:
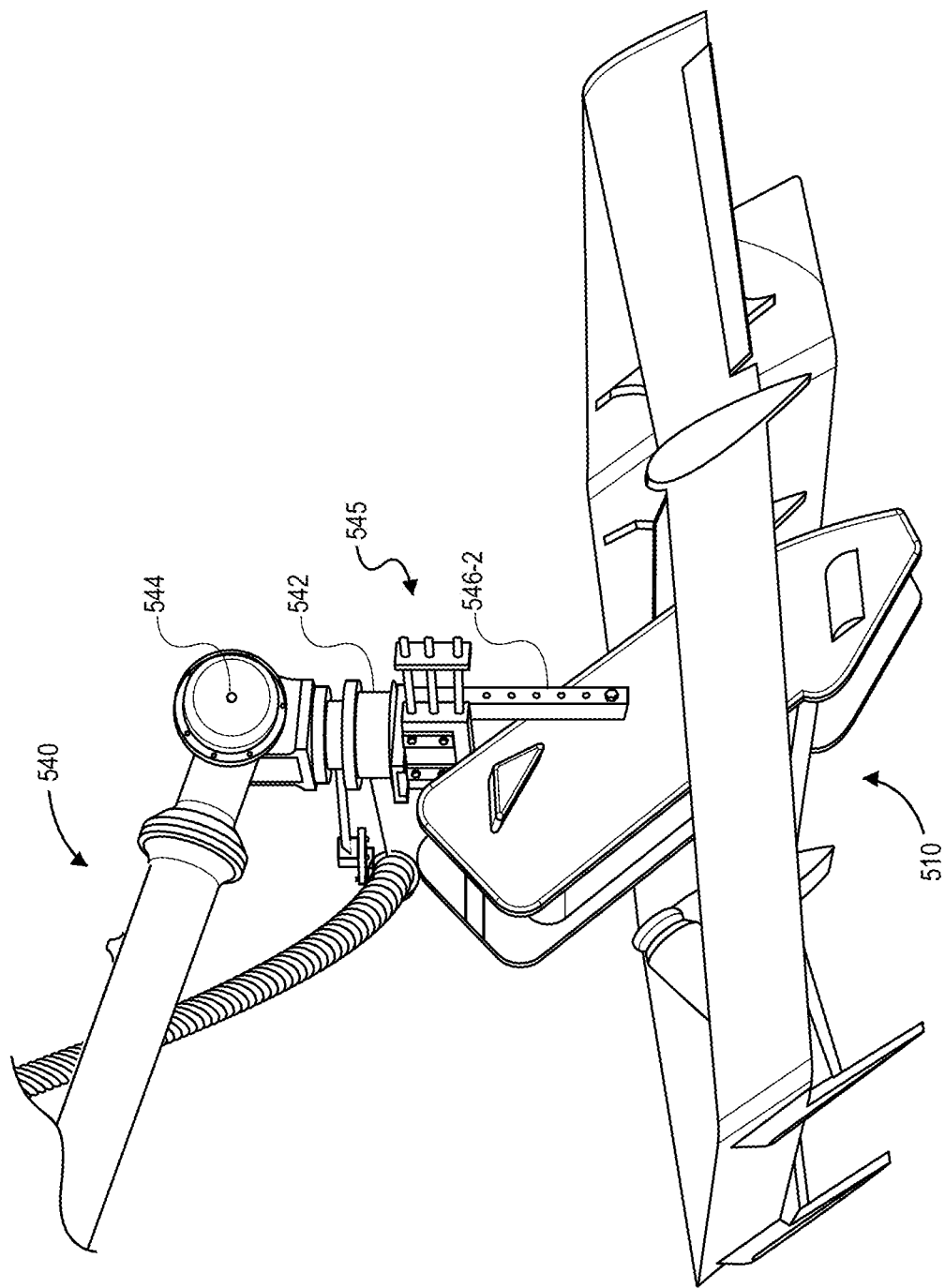

As is discussed above, a robotic arm of a handling system may include an end effector or other grasping element provided at a distal end. The end effector may be specifically configured to releasably mate with a contact point of an aerial vehicle, thereby enabling the robotic arm to subject the aerial vehicle to one or more movements or other manipulations. Referring to FIGS. 5A through 5C, views of aspects of one system for determining vehicle integrity in accordance with embodiments of the present disclosure are shown. Except where otherwise noted, reference numerals preceded by the number "5" shown in FIGS. 5A through 5C indicate components or features that are similar to components or features having reference numerals preceded by the number "2" shown in FIGS. 2A and 2B or by the number "1" shown in FIGS. 1A through 1G.

As is shown in FIG. 5A, a robotic arm 540 includes a sensor 542, an articulating pivot 544, and an end effector 545. The sensor 542 may be a load cell or other sensor (e.g., a laser range finder, a camera, a microphone or another sensor) for determining forces or torques acting on the end effector 545, or for sensing vibrations at the end effector 545. As is shown in FIG. 5A, the articulating pivot 544 joins a pair of segments of the robotic arm 540, and the sensor 542 is rigidly coupled to the robotic arm 540 at or near the end effector 545, e.g., at a wrist joint of the robotic arm 540. As is also shown in FIG. 5A, the end effector 545 includes a pair of arms 546-1, 546-2 aligned substantially parallel to one another, each having an engagement member (or engagement extension) 548-1, 548-2 provided on interior, facing portions of the arms 546-1, 546-2.

In some embodiments, one or both of the arms 546-1 and 546-2 can articulate between an open position of the end effector 545 and a closed position of the end effector 545, in order to securely engage an object (e.g., an aerial vehicle) therebetween. The movement of one or both of the arms 546-1 and 546-2 may be performed via one or more motors (e.g., servo motors, stepper motors, or others), actuators (e.g., linear actuators, rotary actuators, or others), pneumatic systems, worm screw arrangements, hydraulic systems, linkages, gears, belts, or other components in order to initiate relative movement of the arms 546-1 and 546-2 between the open and closed positions.

As is shown in FIGS. 5B and 5C, as the arms 546-1 and 546-2 are articulated from an open position to a closed position to engage an aerial vehicle, engagement members 548-1 and 548-2 can engage an aerial vehicle 510 by one or more contact points 515 in the form of openings, cavities or recesses, and the engagement members 548-1 and 548-2 may include one or more protrusions, bars or other extensions that are sized and shaped to be received into such openings, cavities or recesses.

In some embodiments, the engagement members 548-1 and 548-2 can include keyed protrusions, and the contact points 515 may include openings, cavities or recesses having shapes that complement the engagement members 548-1, 548-2, in order to facilitate secure receipt of the engagement members 548-1 and 548-2 within the contact points 515. Alternatively, in some embodiments, the engagement members 548-1, 548-2 may include features that are biased for expansion or extension within the contact points 515 once the engagement members 548-1, 548-2 are received therein. For example, the engagement members 548-1, 548-2 may be formed from resilient, deformable materials that expand within the contact points 515, or may include spring-biased elements that are biased in radial directions, in order to contact interior portions of the contact points 515 when the engagement members 548-1, 548-2 are received therein. In some embodiments, the end effector 545 may include one or more sensors for determining a closing force that is applied in engaging with and gripping the aerial vehicle 510 between the arms 546-1, 546-2.

Figure 6A:
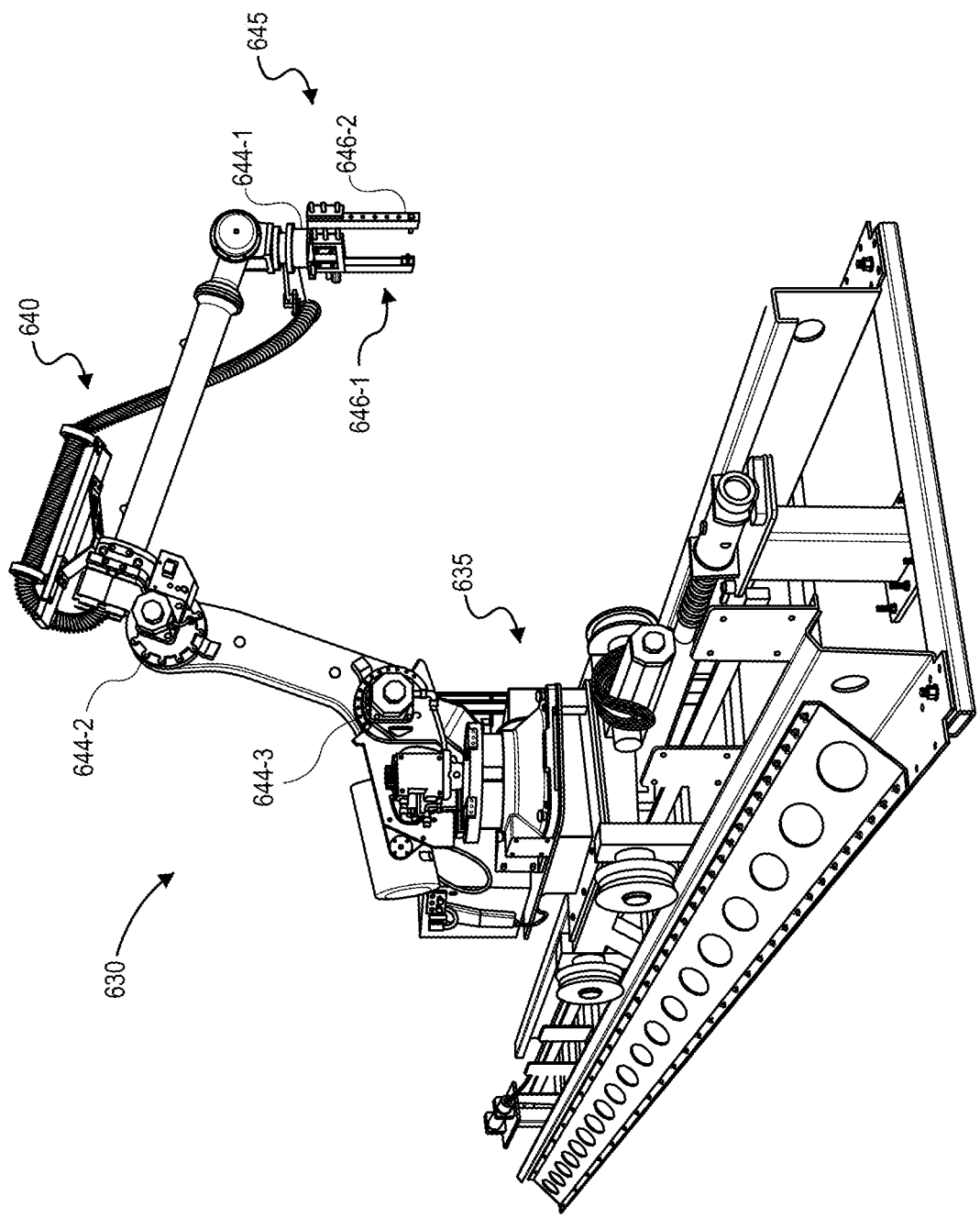
FIGS. 6A and 6B are views of aspects of one system for determining vehicle integrity in accordance with embodiments of the present disclosure.
Figure 6B:
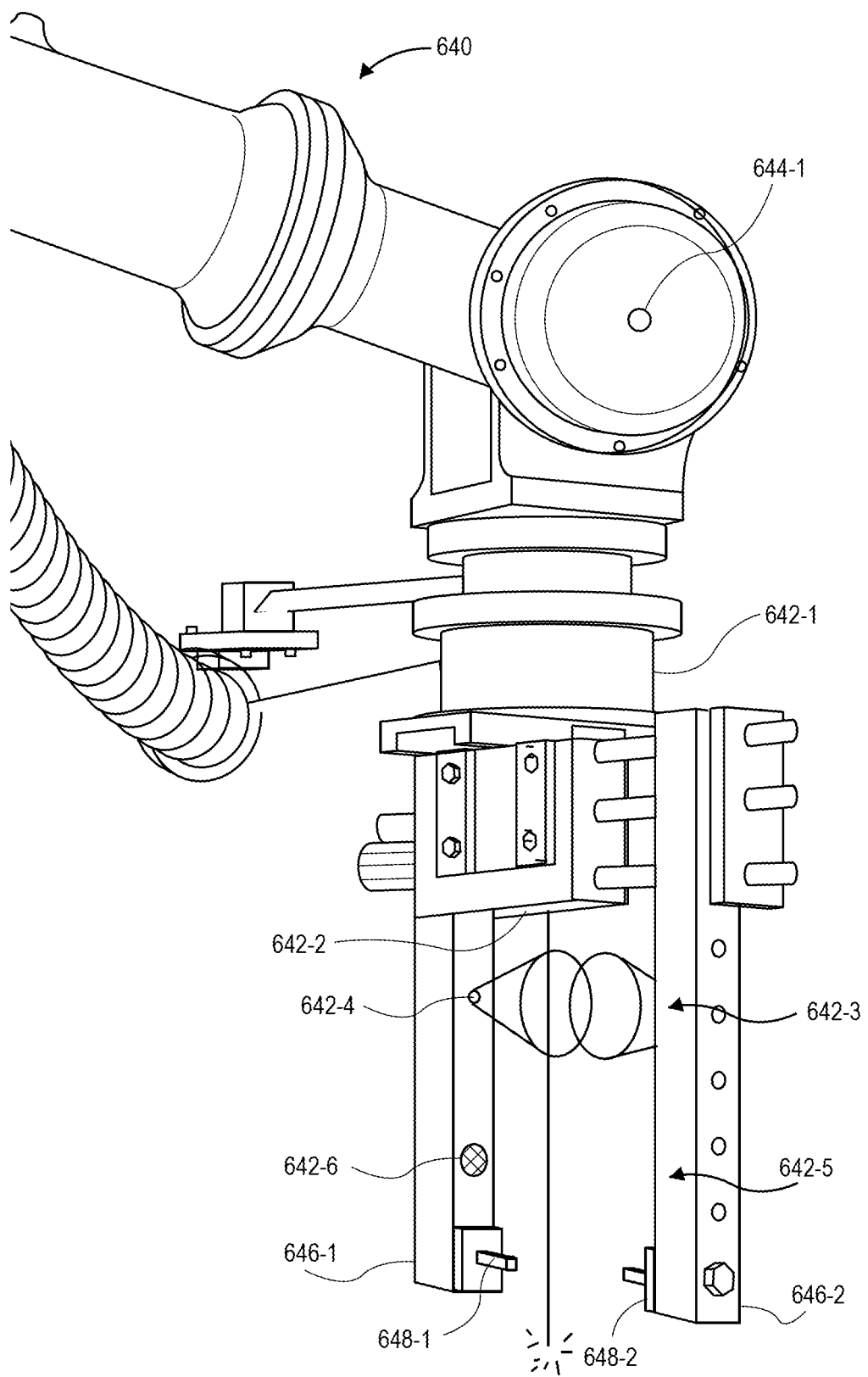

As is also discussed above, a handling system may include any number of sensors for detecting forces, torques, or power or energy levels of vibration of an object (e.g., a vehicle) engaged by an end effector. Referring to FIGS. 6A and 6B, views of aspects of one system for determining vehicle integrity in accordance with embodiments of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A through 5C, by the number "2" shown in FIGS. 2A and 2B or by the number "1" shown in FIGS. 1A through 1G.

As is shown in FIG. 6A, a handling system 630 includes a carriage 635 and a robotic arm 640. The carriage 635 is configured to travel on a set of rails, tracks or other systems. The robotic arm 640 is mounted to the carriage 635 at a proximal end and includes a plurality of articulating pivots 644-1, 644-2, 644-3 joining segments of the robotic arm 640 and an end effector 645 provided at a distal end of the robotic arm 640. The end effector 645 includes a pair of arms 646-1, 646-2, which may be configured to articulate between open and closed positions, in order to securely engage an object (e.g., an aerial vehicle) therebetween. The movement of one or both of the arms 646-1 and 646-2 may be performed via one or more motors, actuators, pneumatic systems, worm screw arrangements, hydraulic systems, linkages, gears, belts, or other systems.

As is shown in FIG. 6B, the end effector 645 includes a plurality of sensors 642-1, 642-2, 642-3, 642-4, 642-5, 642-6. The sensor 642-1 may be a load cell or another sensor (e.g., a laser range finder, a camera, a microphone or another sensor) for determining forces or torques acting on the end effector 645, or for sensing vibrations at the end effector 645. Although the sensor 642-1 is shown as being coupled to the robotic arm 640 at or near a wrist joint, the sensor 642-1 or another load cell for sensing forces or torques may be provided at any location along a length of the robotic arm 640.

As is also shown in FIG. 6B, the end effector 645 includes a sensor 642-2 in the form of a laser range sensor aligned vertically downward toward an object (e.g., a vehicle) engaged between the arms 646-1, 646-2. A power level or energy level of vibration of the object may be determined based on variations in distances between the sensor 642-2 and an external skin or other surface of the object. Additionally, each of the arms 646-1, 646-2 further includes a sensor 642-3, 642-4 in the form of a camera or another imaging device, a sensor 642-5, 642-6 in the form of a microphone or another acoustic sensor, and an engagement member 648-1, 648-2 provided on interior, facing portions of the arms 646-1, 646-2.

The sensors 642-3, 642-4 are aligned to include one or more surfaces of an object (e.g., a vehicle) provided between the arms 646-1, 646-2, and to capture imaging data during and after the object is subjected to one or more movements or manipulations. The imaging data may be processed in any manner in order to detect vibrations of aspects of the object appearing within the respective fields of view, e.g., according to one or more optical flow methods or techniques, and to determine power or energy levels associated with any observed vibrations of the object.

Similarly, the sensors 642-5, 642-6 are aligned to include at least a portion of the object within an operating range of the sensors 642-5, 642-6, and are configured to capture acoustic data during and after a movement or manipulation of an object (e.g., a vehicle) provided between the arms 646-1, 646-2, and the acoustic data may be processed in any manner to detect vibrations or to determine power or energy levels associated with the vibrations.

The engagement members 648-1, 648-2 may include one or more protrusions, bars or other extensions that are sized and shaped to be received into openings, cavities or recesses of an object (e.g., a vehicle) provided between the arms 646-1, 646-2.

Figure 7A:
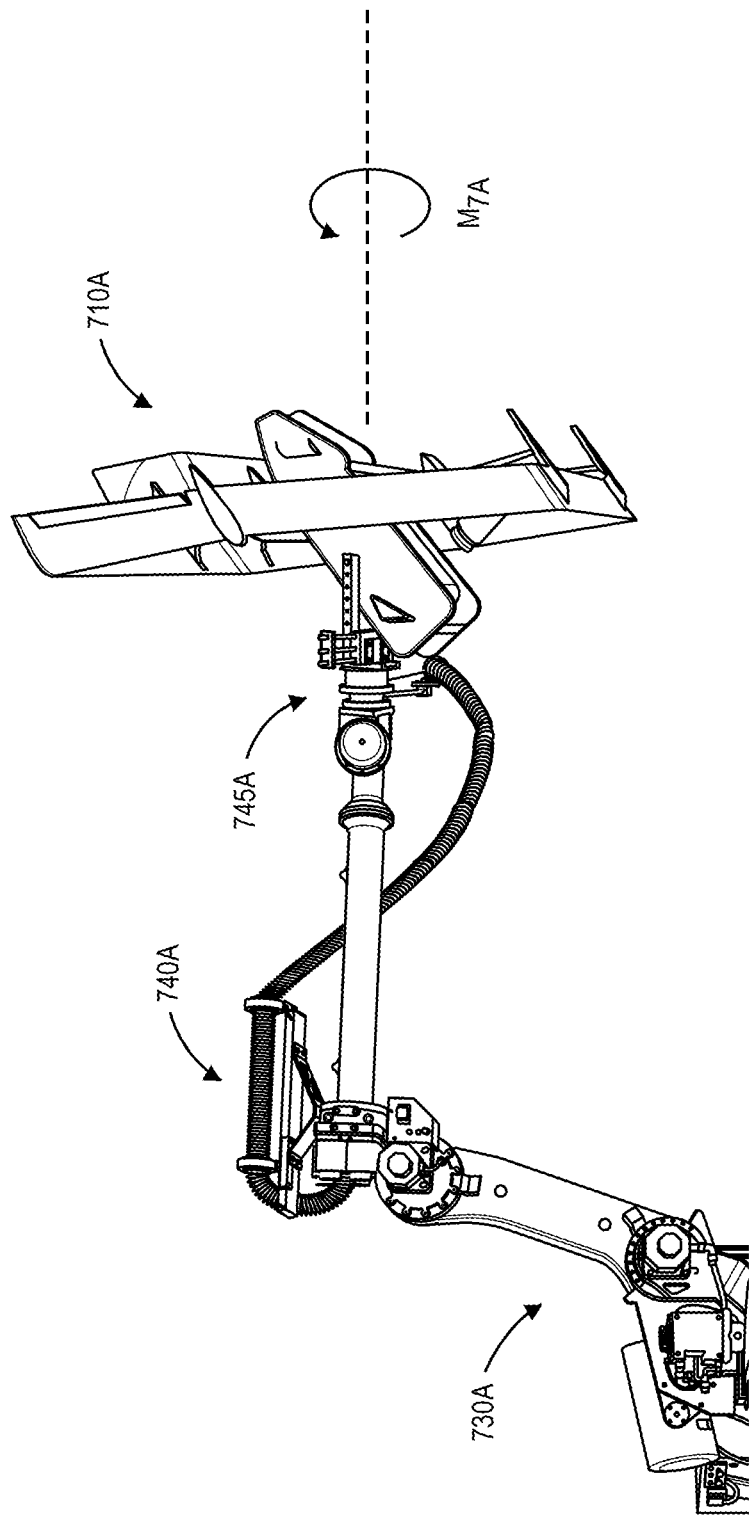
Figure 7C:
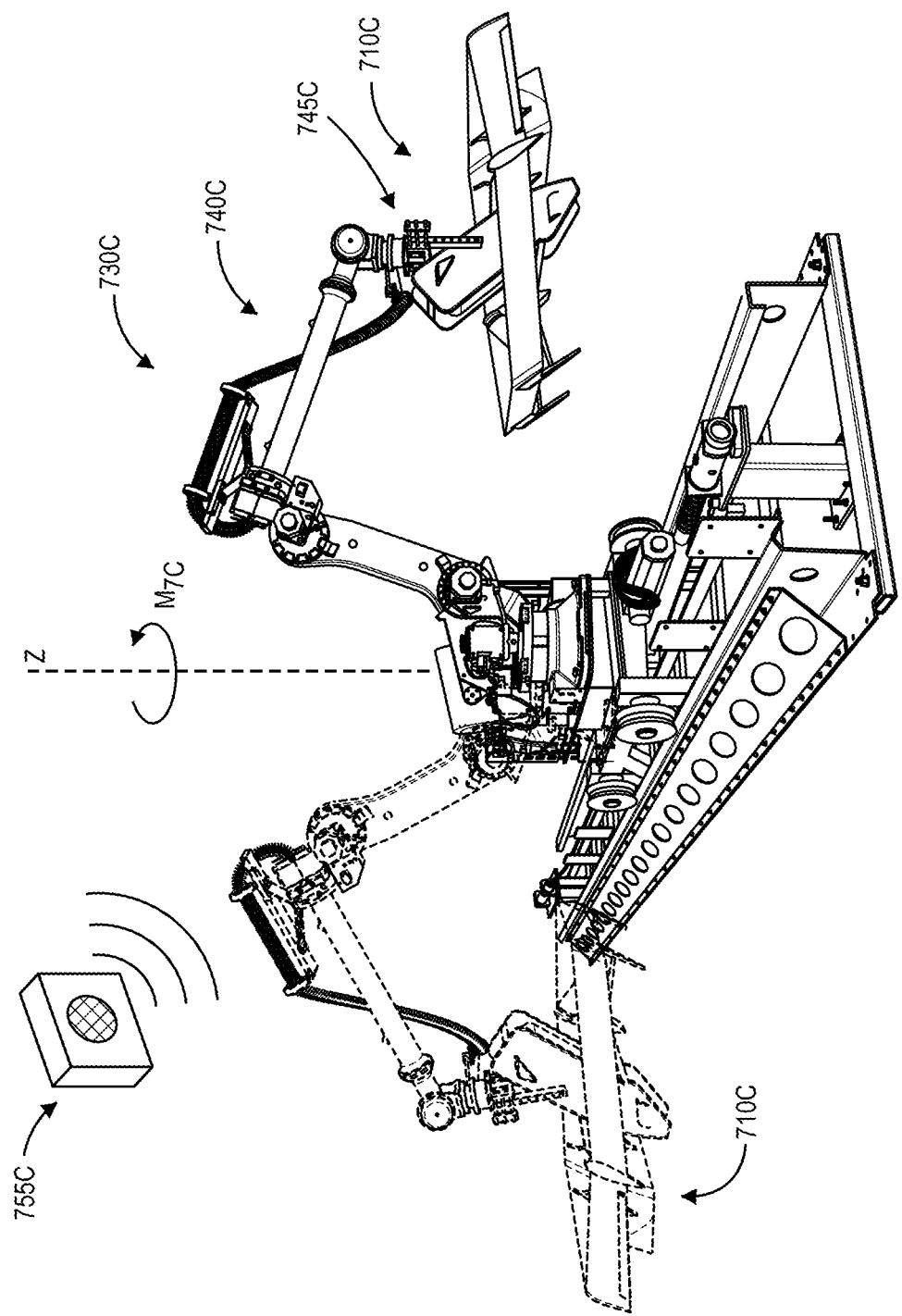

In accordance with embodiments of the present disclosure, a handling system may engage with an object (e.g., a vehicle) and cause the vehicle to undergo any type or form of movement or manipulation that results in a change in one or more of a position, an orientation, a velocity or an acceleration of the object. Referring to FIGS. 7A through 7C, views of aspects of one system for determining vehicle integrity in accordance with embodiments of the present disclosure are shown. Except where otherwise noted, reference numerals preceded by the number "7" shown in FIGS. 7A through 7C indicate components or features that are similar to components or features having reference numerals preceded by the number "6" shown in FIGS. 6A and 6B, by the number "5" shown in FIGS. 5A through 5C, by the number "2" shown in FIGS. 2A and 2B or by the number "1" shown in FIGS. 1A through 1G.

As is shown in FIG. 7A, a handling system 730A includes a robotic arm 740A having an end effector 745A that is engaged with an aerial vehicle 710A in a secure manner. The robotic arm 740A causes the aerial vehicle 710A to undergo a movement $M_{7A}$ that rotates the aerial vehicle 710A about an axis defined by the engagement of the aerial vehicle 710A with the end effector 745A. Data may be captured during the movement $M_{7A}$ using one or more sensors provided in association with the robotic arm 740A in general, or the end effector 745A in particular, including but not limited to load cells (or other force sensors or torque sensors), laser range sensors, imaging devices, acoustic sensors, or others. The data may be used to derive a signature representative of the inertial or vibratory response of the aerial vehicle 710A to the movement $M_{7A}$. Such a signature may be stored in association with the aerial vehicle 710A and used for any purpose.

As is shown in FIG. 7B, a handling system 730B includes a robotic arm 740B having an end effector 745B that is engaged with an aerial vehicle 710B in a secure manner. The handling system 730B causes the aerial vehicle 710B to undergo a movement $M_{7B}$, which includes travel on a set of rails or other systems on a ground surface by the handling system 730B as the robotic arm 740B vertically raises and lowers the aerial vehicle 710B with respect to the ground surface. Data may be captured during the movement $M_{7B}$ using one or more sensors provided in association with the robotic arm 740B in general, or the end effector 745B in particular, and used to derive a signature representative of the inertial or vibratory response of the aerial vehicle 710B to the movement $M_{7B}$. Such a signature may be stored in association with the aerial vehicle 710B and used for any purpose.

As is shown in FIG. 7C, a handling system 730C includes a robotic arm 740C having an end effector 745C that is engaged with an aerial vehicle 710C in a secure manner. The handling system 730C causes the aerial vehicle 710C to undergo a movement $M_{7C}$, e.g., by rotating the aerial vehicle 710C about a substantially vertical axis, from a location on one side of a set of rails or other systems on which the handling system 730C is configured for travel to another side of the set of rails or other systems on which the handling system 730C is configured for travel. Additionally, as is also shown in FIG. 7C, the aerial vehicle 710C is subjected to extrinsic excitation by an acoustic energy source 755C (e.g., an audio speaker). Data may be captured during the movement $M_{7C}$ using one or more sensors provided in association with the robotic arm 740C in general, or the end effector 745C in particular, and used to derive a signature representative of the inertial or vibratory response of the aerial vehicle 710C to the movement $M_{7C}$. Such a signature may be stored in association with the aerial vehicle 710C and used for any purpose. Alternatively, or additionally, the aerial vehicle 710C may be subjected to intrinsic excitation during the movement $M_{7C}$, e.g., by operating one or more propulsion motors, control surfaces or other systems provided aboard the aerial vehicle 710C during the movement $M_{7C}$.

Those of ordinary skill in the pertinent arts will recognize that the systems and methods of the present disclosure are not limited to any of the movements or manipulations shown or described herein. Any type or form of movement or manipulation that results in a change in a position, an orientation, a velocity or an acceleration of an object may be imparted upon the object in accordance with embodiments of the present disclosure, and data regarding forces, torques, or power or energy levels captured during the movement or manipulation may be plotted with respect to time or frequency and used to derive an inertial signature or vibratory signature.

As is also discussed above, a baseline signature may be derived based on data captured while subjecting one of the vehicles of a common design, class or fleet that is known to be structurally and aerodynamically sound, and at a sufficiently high level of integrity, to a predetermined movement or manipulation. Thereafter, any one of the vehicles of the common design, class or fleet may be subjected to the same predetermined movement or manipulation. A signature derived based on data captured during the predetermined movement or manipulation may be compared to the baseline signature in order to determine whether the one of the vehicles is also structurally and aerodynamically sound, and at a sufficiently high level of integrity, or whether the one of the vehicles requires further maintenance, inspections or repairs.

Figure 8A:
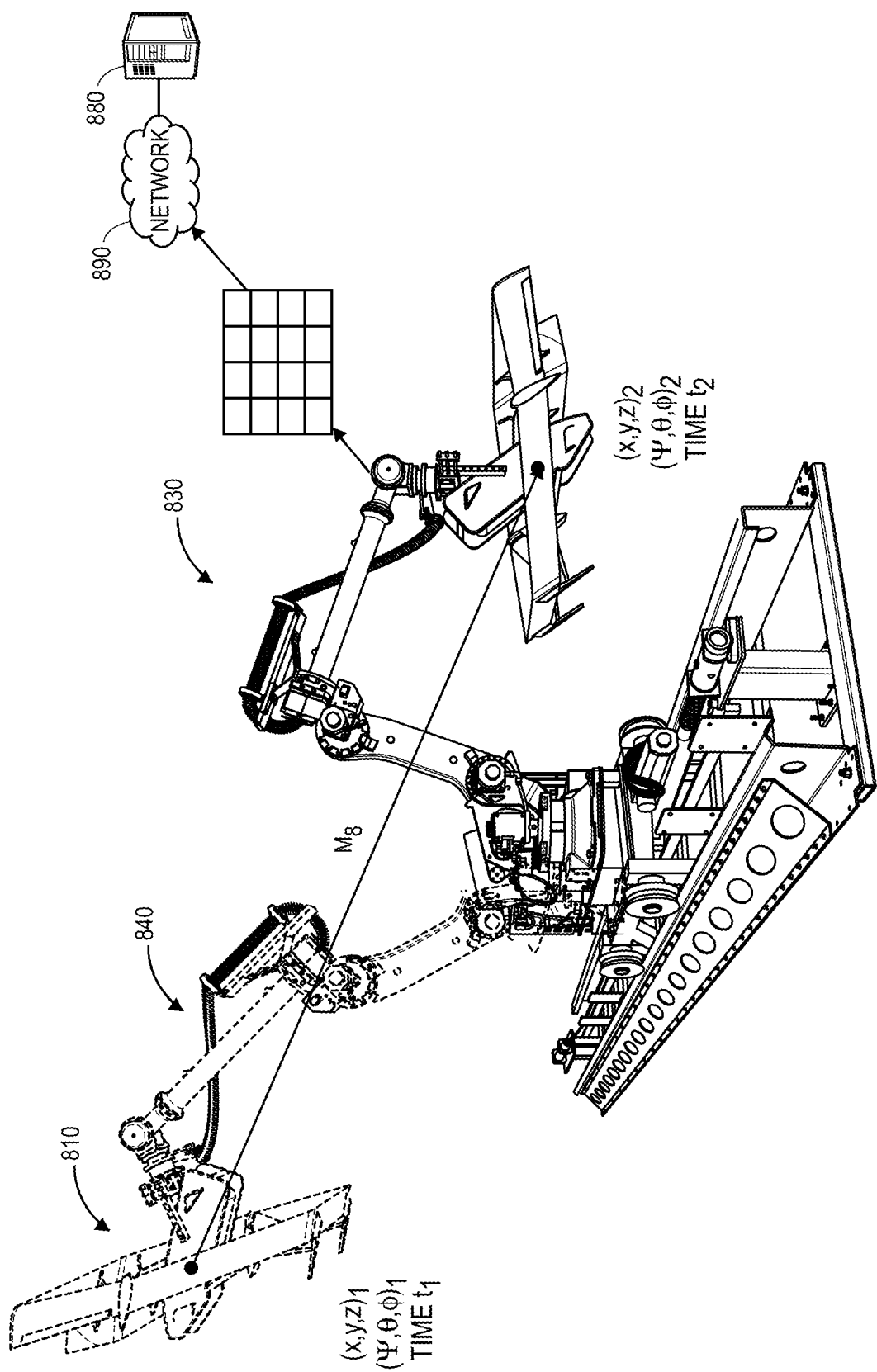
FIGS. 8A through 8C are views of aspects of one system for determining vehicle integrity in accordance with embodiments of the present disclosure.
Figure 8B:
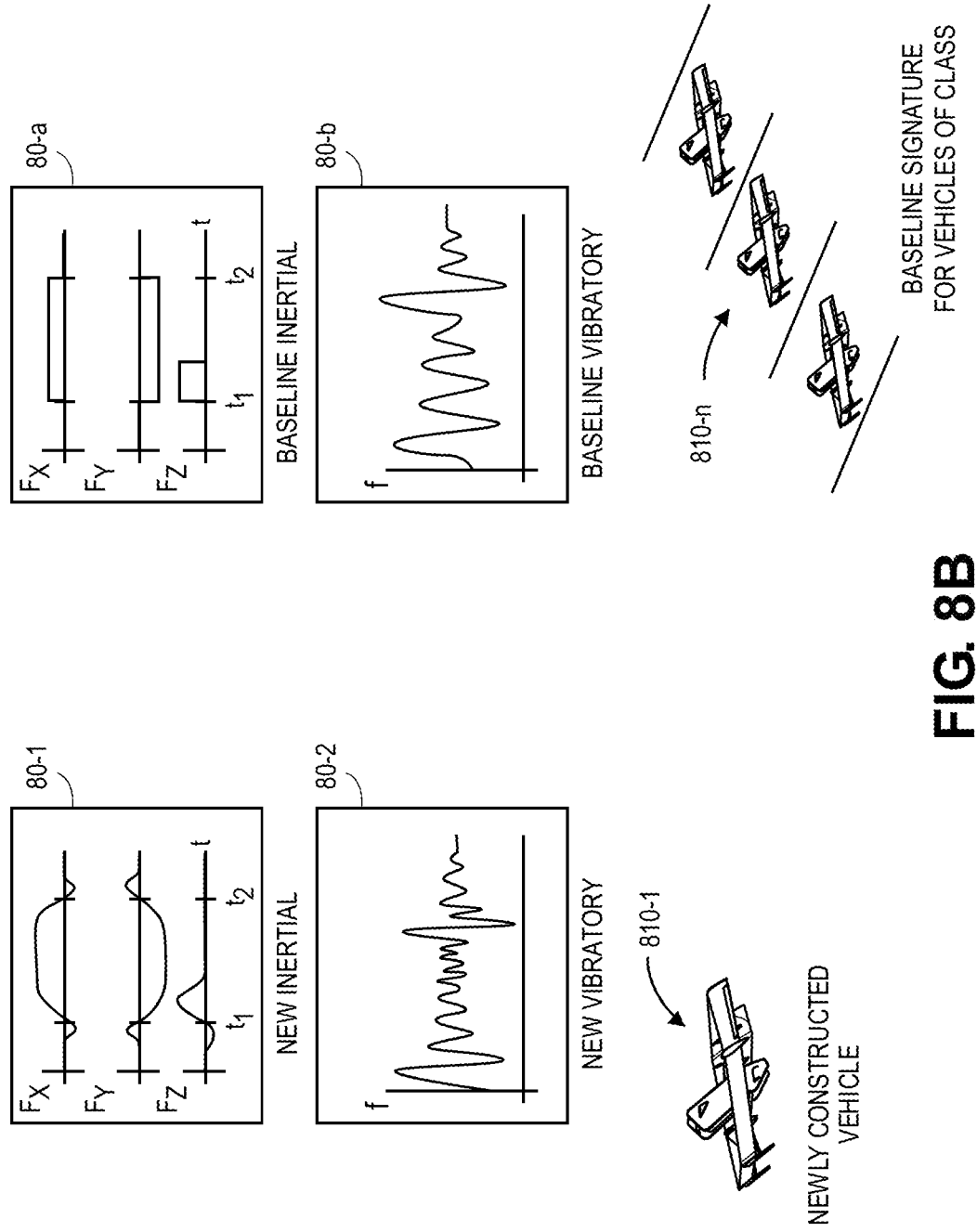
Figure 8C:
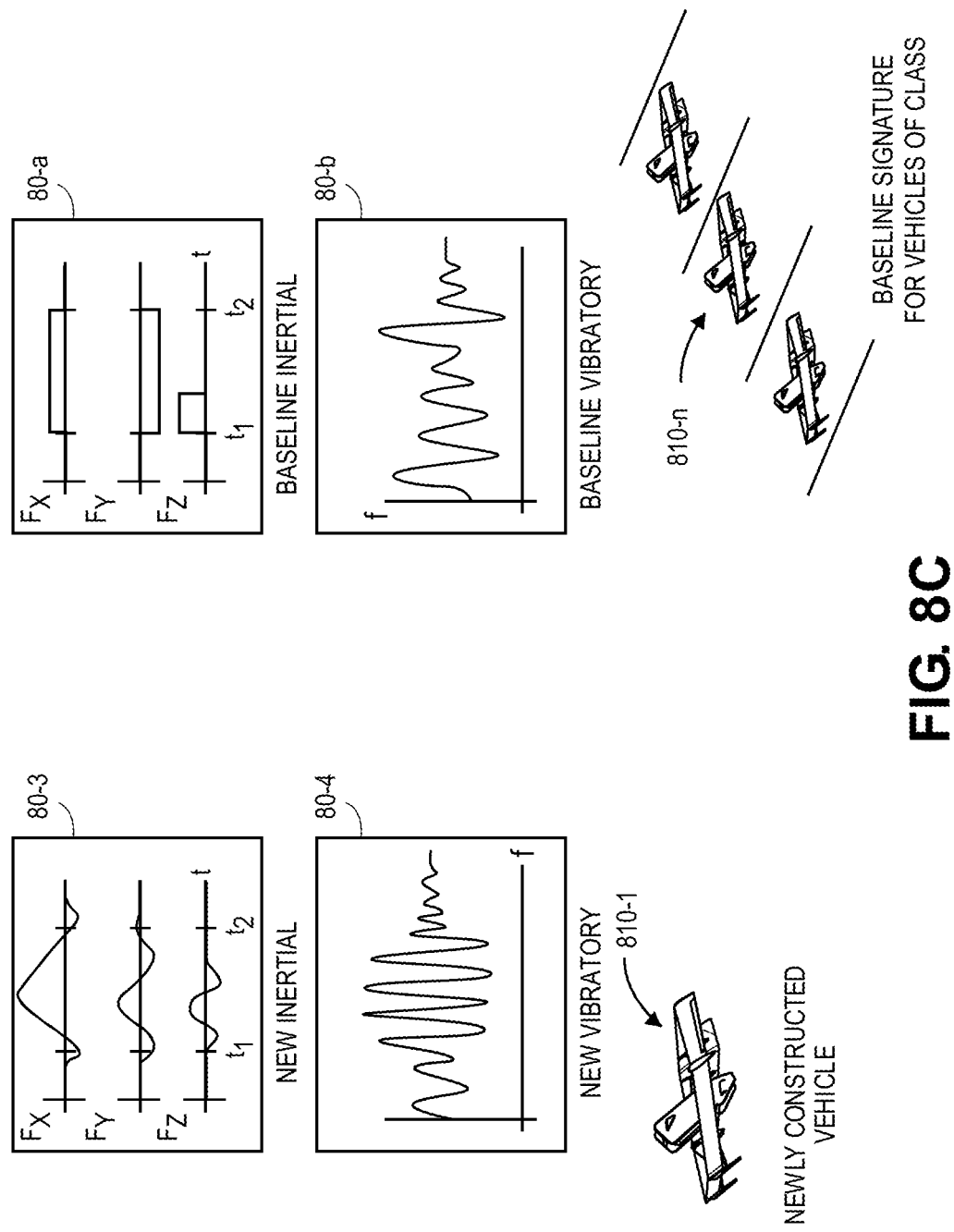

Referring to FIGS. 8A through 8C, views of aspects of one system for determining vehicle integrity in accordance with embodiments of the present disclosure are shown. Except where otherwise noted, reference numerals preceded by the number "8" shown in FIGS. 8A through 8C indicate components or features that are similar to components or features having reference numerals preceded by the number "7" shown in FIGS. 7A through 7C, by the number "6" shown in FIGS. 6A and 6B, by the number "5" shown in FIGS. 5A through 5C, by the number "2" shown in FIGS. 2A and 2B or by the number "1" shown in FIGS. 1A through 1G.

As is shown in FIG. 8A, an aerial vehicle 810 is grasped by a robotic arm 840 of a handling system 830. Alternatively, any other type or form of object or vehicle including but not limited to a manned aerial vehicle, an autonomous ground vehicle or robot, an automobile, or any other object may be grasped and moved or otherwise manipulated by the handling system 830.

As is also shown in FIG. 8A, the aerial vehicle 810 is subjected to a movement $M_8$ from a first position in three-dimensional space and a first orientation about one or more axes (e.g., x-, y- and z-axes, or yaw, pitch and roll axes), such as a position $(x, y, z)_1$ and an orientation $(\varphi, \theta, \phi)_1$, at a time $t_1$ to a second position in three-dimensional space and a second orientation about the one or more principal axes, such as a position $(x, y, z)_2$ and an orientation $(\varphi, \theta, \phi)_2$, at a time $t_2$.

The handling system 830 captures data such as forces, torques, or power or energy levels of vibration during or after the movement $M_8$, and transmits the data to a computer system 880 (e.g., a server) over a network 890. The server 880 is programmed or configured to derive a signature representative of the inertial or vibratory response of the aerial vehicle 810 to the movement $M_8$ based on the data. For example, the server 880 may be programmed to transform the data representative of such forces, torques, or power or energy levels of vibration sensed during or after the movement $M_8$ to a frequency domain, e.g., by a fast Fourier transform, and to derive a signature from a plot of the data with respect to frequency.

As is shown in FIG. 8B, an inertial signature 80-1 and a vibratory signature 80-2 representative of inertial and vibratory responses, respectively, of the aerial vehicle 810-1 to the movement $M_8$ are compared to a baseline inertial signature 80-a and a baseline vibratory signature 80-b derived from data captured during or after subjecting one or more vehicles 810-n of a common design, class or fleet that includes the aerial vehicle 810-1 and are known to be structurally and aerodynamically sound, and of a sufficiently high level of integrity, to the same movement $M_8$. Where the inertial signature 80-1 is determined to be consistent with the baseline inertial signature 80-a, and where the vibratory signature 80-2 is determined to be consistent with the baseline vibratory signature 80-b, such as is shown in FIG. 8B, the aerial vehicle 810-1 may be determined to be structurally and aerodynamically sound, and the aerial vehicle 810-1 may be cleared to perform one or more missions of any type or form that may be performed by aerial vehicles 810-n of the class. The inertial signature 80-1 and the vibratory signature 80-2 may be identified as consistent with the baseline inertial signature 80-a or the baseline vibratory signature 80-b on any basis, including but not limited to values of forces, torques, or power levels (or energy levels) of vibration at specific times or frequencies, or on any other basis. Alternatively, in some embodiments, the aerial vehicle 810-1 may be cleared to perform one or more missions of any type or form where either the inertial signature 80-1 is consistent with the baseline inertial signature 80-a, or the vibratory signature 80-2 is consistent with the baseline vibratory signature 80-b, and not necessarily both.

As is shown in FIG. 8C, an inertial signature 80-3 and a vibratory signature 80-4 representative of inertial and vibratory responses, respectively, of the aerial vehicle 810-1 to the movement $M_8$ are compared to the baseline inertial signature 80-a and the baseline vibratory signature 80-b. Where the inertial signature 80-3 is determined to be inconsistent with the baseline inertial signature 80-a, and where the vibratory signature 80-4 is determined to be inconsistent with the baseline vibratory signature 80-b, such as is shown in FIG. 8C, the aerial vehicle 810 may not be confirmed to be structurally and aerodynamically sound, and further inspections or maintenance may be required before the aerial vehicle 810-1 may be cleared to perform one or more missions. The inertial signature 80-3 and the vibratory signature 80-4 may be identified as inconsistent with the baseline inertial signature 80-a or the baseline vibratory signature 80-b on any basis, including but not limited to values of forces, torques, or power levels (or energy levels) of vibration at specific times or frequencies, or on any other basis.

In some embodiments, a signature derived from data captured as a vehicle undergoes a movement or a manipulation by a handling system may be compared to not only a signature that was previously derived for the vehicle (or another vehicle of a common design, class or fleet) in a structurally and aerodynamically sound condition but also for signatures that were previously derived for the vehicle, or for other vehicles of a common design, class or fleet, and are known to be consistent with specific anomalies or conditions of a vehicle. Because such anomalies or conditions may cause the vehicle or vehicles to exhibit different inertial or vibratory responses to the movement or manipulation, the vehicle may be understood or determined to be experiencing one of the anomalies or conditions where the signature derived for the vehicle corresponds to or is consistent with a signature that is associated with the one of the anomalies or conditions.

Figure 9:
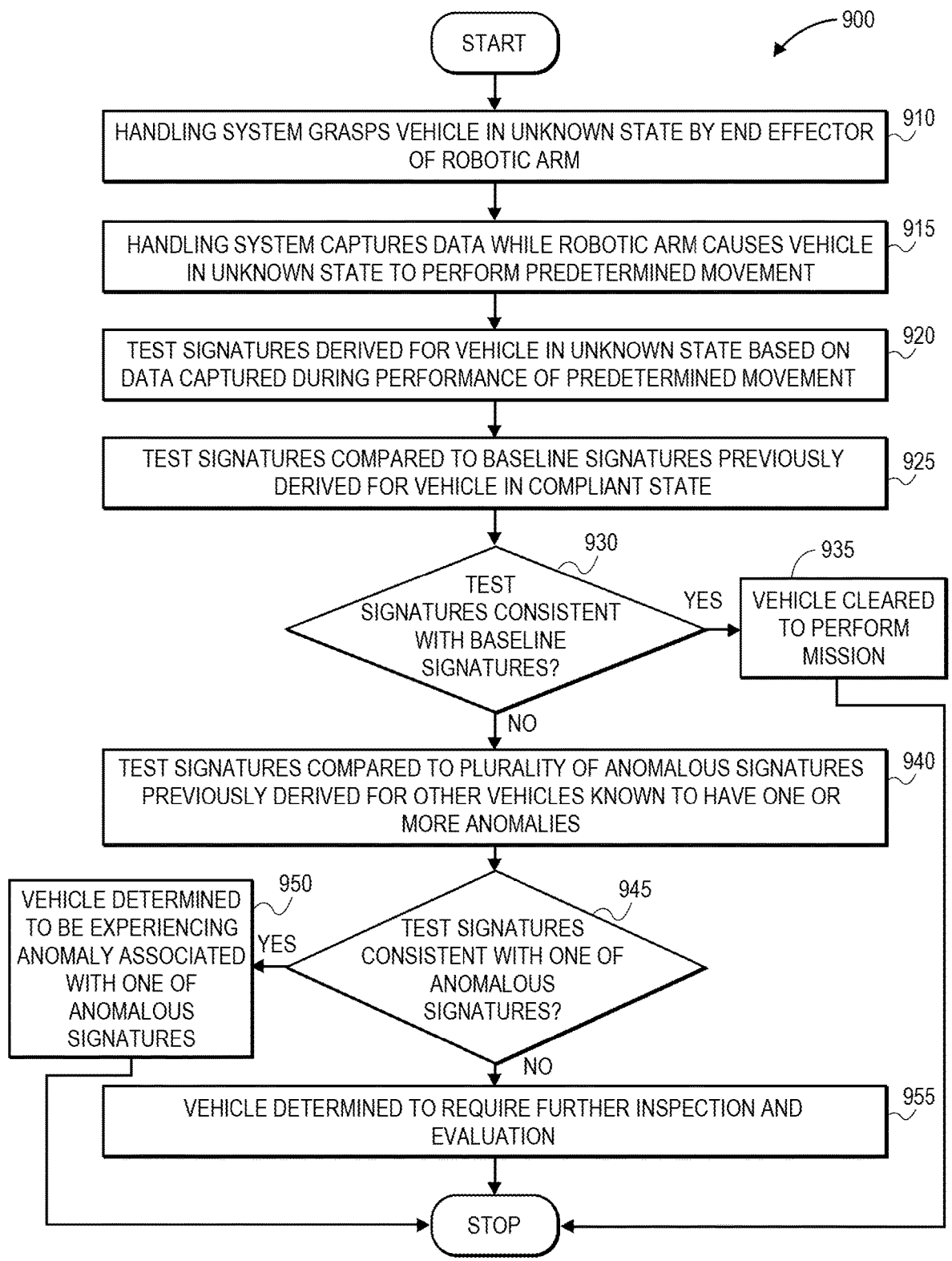
FIG. 9 is a flow chart of one process for determining vehicle integrity in accordance with embodiments of the present disclosure.

Referring to FIG. 9, a flow chart 900 of one process for determining vehicle integrity in accordance with embodiments of the present disclosure is shown. At box 910, a handling system grasps a vehicle in an unknown state by an end effector of a robotic arm. For example, the end effector may engage the vehicle at a contact point having one or more corresponding openings or other features for receiving arms or engagement extensions of the end effector. At box 915, the handling system captures data while the robotic arm causes the vehicle in the unknown state to perform a predetermined movement. For example, the handling system may include one or more load cells or other sensors for capturing information or data regarding the behavior of the vehicle during the predetermined movement, including forces, torques, or power or energy levels of vibration, or any other information or data.

At box 920, test signatures are derived for the vehicle in the unknown state based on the data captured at box 915 during the performance of the predetermined movement. For example, the test signatures may be derived by plotting the data with respect to time, or by transforming the data captured at box 915 to a frequency domain, such as by a fast Fourier transform, or in any other manner, and plotting the data with respect to frequency.

At box 925, the test signatures derived for the vehicle at box 920 is compared to baseline signatures previously derived for another vehicle that is known to be in a compliant state. For example, where the vehicles are of a common design, class or fleet, the baseline signatures may be derived based on data captured while subjecting one of the vehicles to the predetermined movement, and applied to each of the vehicles of the common design, class or fleet. Alternatively, the test signatures may be compared to baseline signatures previously derived for the vehicle when the vehicle was known to be in a structurally and aerodynamically sound condition, and at a sufficiently high level of integrity.

At box 930, whether the test signatures are consistent with the baseline signatures are determined. If the test signatures are consistent with the baseline signatures, then the process advances to box 935, where the vehicle is cleared to perform one or more missions, and the process ends. For example, where the test signatures include values of forces, torques, or power or energy levels of vibration at times or frequencies that are substantially similar to values of forces, torques, or power or energy levels of vibration at the same times or frequencies of the baseline signature, the test signatures may be deemed consistent with the baseline signatures, and the vehicle may be deemed structurally and aerodynamically sound.

If the test signatures are not consistent with the baseline signatures, however, then the process advances to box 940, where the test signatures are compared to a plurality of anomalous signatures previously derived for vehicles that are known to have one or more anomalies. For example, if the values of forces, torques, or power or energy levels of vibration and corresponding times or frequencies do not match the values and corresponding times or frequencies of the baseline signatures, the values and corresponding times or frequencies of the test signatures may be compared to those of one or more other signatures that were derived after vehicles that were known to be experiencing one or more anomalies were subjected to the predetermined movement, based on data captured during the predetermined movement.

At box 945, whether the test signatures are consistent with one of the anomalous signatures is determined. If the test signatures are consistent with one of the anomalous signatures, then the process advances to box 950, where the vehicle is determined to be experiencing an anomaly associated with the one of the anomalous signatures with which the test signatures are consistent, and the process ends. For example, where a test signatures includes values of forces, torques, or power or energy levels of vibration at times or frequencies that are substantially similar to values of forces, torques, or power or energy levels of vibration at the same times or frequencies of one of the anomalous signatures, the vehicle may be determined to be experiencing the specific anomaly corresponding to the one of the anomalous signatures.

The vehicle may then require one or more maintenance, inspection or repair techniques, including a maintenance, inspection or repair technique directed to that specific anomaly, prior to being cleared to perform a mission. In some embodiments, after performing such maintenance, inspection or repair techniques on the vehicle, the vehicle may then be grasped by the handling system, and caused to perform the predetermined movement again. Data captured during the predetermined movement may be used to derive a signature for the vehicle, which may then be compared to the baseline signature in order to determine whether the vehicle may be cleared to perform one or more missions, or whether further maintenance, inspection or repairs are necessary.

If the test signatures are not consistent with any of the anomalous signatures, then the process advances to box 955, where the vehicle is subjected to inspection and evaluation in order to determine one or more causes or reasons for the inconsistency between the test signatures and the baseline signatures, or to identify any other faults or deficiencies of the vehicle, and the process ends. Alternatively, in some embodiments, where the test signatures derived at box 920 do not closely match any of the anomalous signatures, one or more of the anomalous signatures may be considered, or ruled out for consideration, on any other basis. For example, where one of the anomalous signatures relates to an anomaly associated with cold weather, high-altitude, or high-speed operations, the anomalous signature may be preferentially considered for a vehicle where the vehicle has engaged in cold weather, high-altitude or high-speed operations, or ruled out from consideration where the vehicle has not engaged in cold weather, high-altitude or high-speed operations.

Figure 10:
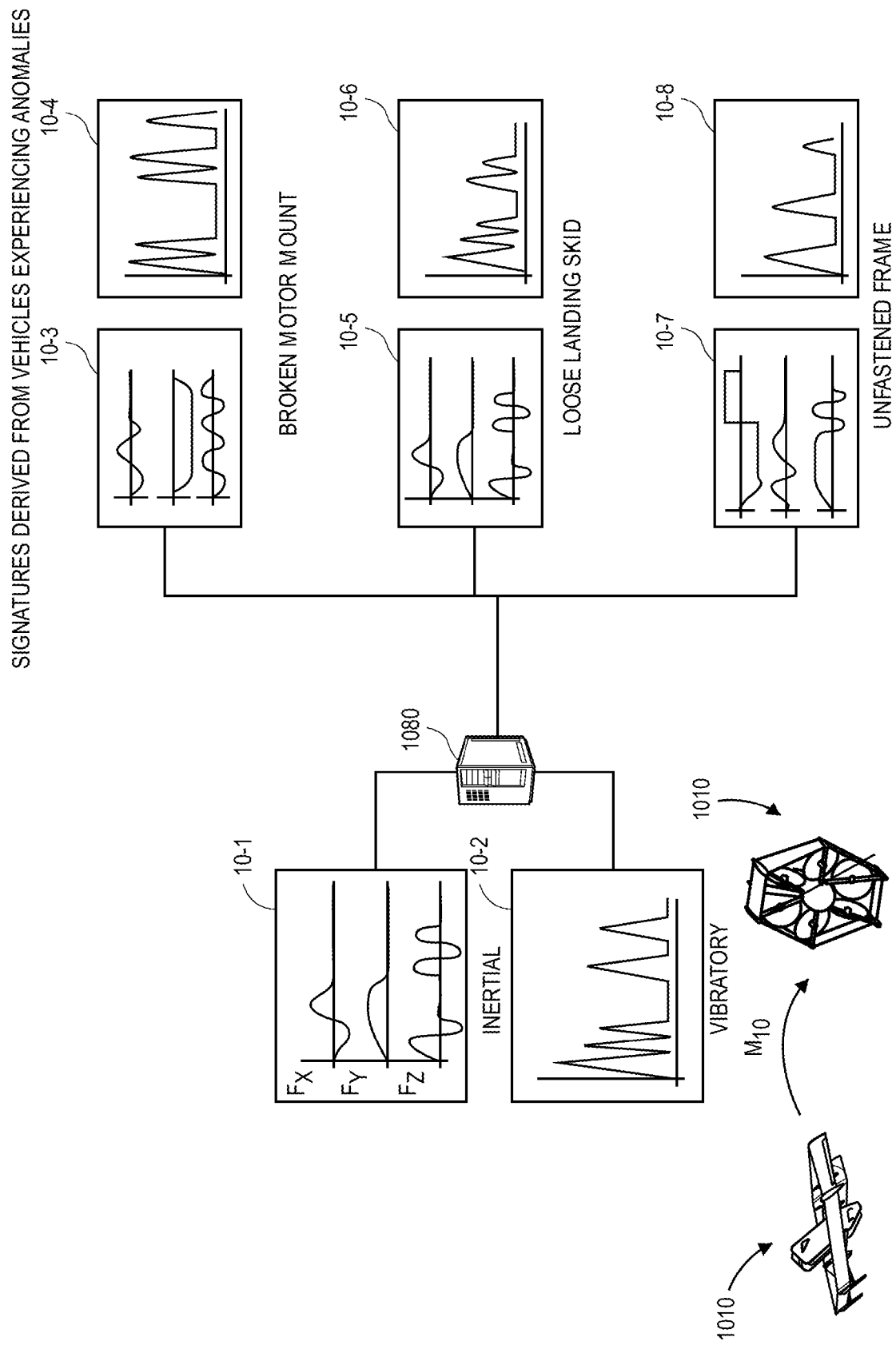
FIG. 10 is a view of aspects of one system for determining vehicle integrity in accordance with embodiments of the present disclosure.

Referring to FIG. 10, a view of aspects of one system for determining vehicle integrity in accordance with embodiments of the present disclosure is shown. Except where otherwise noted, reference numerals preceded by the number "10" shown in FIG. 10 indicate components or features that are similar to components or features having reference numerals preceded by the number "8" shown in FIGS. 8A through 8C, by the number "7" shown in FIGS. 7A through 7C, by the number "6" shown in FIGS. 6A and 6B, by the number "5" shown in FIGS. 5A through 5C, by the number "2" shown in FIGS. 2A and 2B or by the number "1" shown in FIGS. 1A through 1G.

As is shown in FIG. 10, a test inertial signature 10-1 and a test vibratory signature 10-2 are derived by a server (or other computer system) 1080 for an aerial vehicle 1010 based on data captured by one or more sensors of a handling system as the aerial vehicle 1010 is subjected to a movement $M_{10}$ or one or more other manipulations. The test signatures 10-1, 10-2 include plots or another representations of forces, torques, or power or energy levels of vibration with respect to time or frequency, such as local or absolute maximum forces, torques, or power or energy levels at discrete times or frequencies. Alternatively, the test signatures 10-1, 10-2 may be defined to include slopes or derivatives of forces, torques, power levels or energy levels at or around the discrete times or frequencies.

The test signatures 10-1, 10-2 may be compared to a plurality of other signatures 10-3, 10-4, 10-5, 10-6, 10-7, 10-8, each of which is derived based on data captured during or after subjecting the vehicle 1010, or a vehicle of a common design, class or fleet with the vehicle 1010, to the movement $M_{10}$. For example, the test signatures 10-1, 10-2 may be compared to each of the signatures 10-3, 10-4, 10-5, 10-6, 10-7, 10-8 to determine whether the aerial vehicle 1010 is experiencing any of the anomalies associated with such signatures 10-3, 10-4, 10-5, 10-6, 10-7, 10-8.

For example, as is shown in FIG. 10, an inertial signature 10-3 and a vibratory signature 10-4 are derived based on data captured during or after subjecting the aerial vehicle 1010, or an aerial vehicle of a common design, class or fleet with the aerial vehicle 1010, having a broken motor mount to the movement $M_{10}$. An inertial signature 10-5 and a vibratory signature 10-6 are derived based on data captured during or after subjecting the aerial vehicle 1010, or an aerial vehicle of a common design, class or fleet with the aerial vehicle 1010, having a landing skid that is loosely connected to the movement $M_{10}$. An inertial signature 10-7 and a vibratory signature 10-8 are derived based on data captured during or after subjecting the aerial vehicle 1010, or an aerial vehicle of a common design, class or fleet with the aerial vehicle 1010, having a frame that is not properly fastened to the movement $M_{10}$.

Where the test inertial signature 10-1 is consistent with or sufficiently similar to one of the inertial signatures 10-3, 10-5, 10-7, e.g., where the forces, torques, or power or energy levels of vibration at discrete times are substantially equal to the values of such forces, torques, or power or energy levels of vibration at such times, or where the test vibratory signature 10-2 is consistent with or sufficiently similar to one of the vibratory signatures 10-4, 10-6, 10-8, e.g., where the forces, torques, or power or energy levels of vibration at discrete frequencies are substantially equal to the values of such forces, torques, or power or energy levels of vibration at such frequencies, the aerial vehicle 1010 may be determined to be experiencing the discrete anomaly associated with the one of the inertial signatures 10-3, 10-5, 10-7, or the vibratory signatures 10-4, 10-6, 10-8.

For example, as is shown in FIG. 10, because the test inertial signature 10-1 is consistent with or sufficiently similar to the inertial signature 10-5, or because the test vibratory signature 10-2 is consistent with or sufficiently similar to the vibratory signature 10-6, the aerial vehicle 1010 may be presumed to have a loose landing skid, and further inspections or maintenance to address the loose landing skid may be required. In some embodiments, the server 1080 may be programmed with information or data regarding the signatures 10-3, 10-4, 10-5, 10-6, 10-7, 10-8, and may, upon determining or receiving the test inertial signature 10-1 or the test vibratory signature 10-2, or information or data regarding forces, torques, or power or energy levels over a range of times or frequencies, be configured to compare the test inertial signature 10-1 or the test vibratory signature 10-2 or the information or data to one or more of the signatures 10-3, 10-4, 10-5, 10-6, 10-7, 10-8. Alternatively, one or more processors provided aboard the aerial vehicle 1010 or a handling system (not shown) may be configured to perform such a comparison.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein may reference the generation of signatures for unmanned aerial vehicles that are configured to deliver payloads from warehouses or other like facilities to customers, those of ordinary skill in the pertinent arts will recognize that the systems and methods disclosed herein are not so limited, and may be utilized in connection with any type or form of object or vehicle (e.g., manned or unmanned) or component thereof that is configured for any intended industrial, commercial, recreational or other use. Likewise, the systems and methods of the present disclosure are not limited to any of the movements or other manipulations of objects or vehicles described herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 4 or 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    a mobile handling system comprising:
        a carriage portion;
        a robotic arm mounted to the carriage portion, wherein the robotic arm comprises a plurality of pivots and a grasping element;
        at least one sensor associated with the robotic arm, wherein the at least one sensor is configured to measure at least one of a force or a torque imparted upon the grasping element; and
        a control system in communication with each of the plurality of pivots and the grasping element, wherein the control system comprises one or more processors and a memory storage component having one or more sets of instructions stored thereon that, when executed by the one or more processors, cause the control system to at least:
            determine that a vehicle is in a sound condition at a first time;
            cause the robotic arm to engage the vehicle by the grasping element at a second time, wherein the vehicle is at a first position and in a first orientation at the second time, and wherein the second time follows the first time;
            cause the robotic arm to subject the vehicle to a movement over a first period of time, wherein the vehicle is in at least one of a second position or a second orientation after the movement, and wherein the first period of time follows the second time;
            capture first data representing at least one of a force or a torque acting on the grasping element by the at least one sensor during or after the movement, wherein at least some of the first data is captured during or after the first period of time;
            derive a first signature based at least in part on the first data, wherein the first signature comprises a representation of at least one of the force or the torque acting on the grasping element by the at least one sensor during or after the movement with respect to time or frequency;
            store the first signature in association with the vehicle;
            determine that the vehicle has completed a mission not later than a fifth time, wherein the fifth time follows the fourth time;
            cause the robotic arm to engage the vehicle by the grasping element at the fifth time, wherein the vehicle is at the first position and in the first orientation at the fifth time;
            cause the robotic arm to subject the vehicle to the movement at a sixth time, wherein the vehicle is in one of the second position or the second orientation after the movement, and wherein the sixth time follows the fifth time;
            capture second data representing at least one of a force or a torque acting on the grasping element by the at least one sensor during or after the movement, wherein at least some of the second data is captured at a seventh time, and wherein the seventh time follows the sixth time;
            derive a second signature based at least in part on the second data, wherein the second signature comprises a representation of at least one of the force or the torque acting on the grasping element by the at least one sensor during or after the movement with respect to time or frequency;
            generate a comparison of the second signature to the first signature; and
            determine that the vehicle is structurally sound at the seventh time based at least in part on the comparison.

2. The system of claim 1, wherein the movement comprises one or more of:
    moving the vehicle along one or more axes from the first position in three-dimensional space to the second position in three-dimensional space; or
    rotating the vehicle about the one or more axes from the first orientation to the second orientation.

3. A method comprising:
    engaging, by a robotic arm of a handling system, a portion of a first vehicle;
    causing, by the handling system, the first vehicle to undergo a first movement over a first period of time,
    wherein, prior to the first movement, the first vehicle is at least one of:
        at a first position;
        in a first orientation; or
        traveling at a first velocity, and
    wherein, after the first movement, the first vehicle is at least one of:
        at a second position;
        in a second orientation; or
        traveling at a second velocity;
    capturing first data by at least one sensor provided in association with the handling system, wherein at least some of the first data is captured during or after the first period of time;

deriving at least a first signature based at least in part on the first data; and storing the first signature in association with the first vehicle in at least one data store.

4. The method of claim 3, further comprising:

identifying a second signature derived based at least in part on second data, wherein the second data is captured during or after causing one of the first vehicle or a second vehicle to undergo the first movement over a second period of time, wherein the second vehicle is in one of a class, a design or a fleet including the first vehicle, and wherein the second period of time precedes the first period of time;

determining a comparison of the first signature to at least the second signature;

determining an indication of suitability of the first vehicle for performing at least a first mission based at least in part on the comparison; and storing at least the indication of suitability in at least one data store.

5. The method of claim 4, wherein the first data comprises at least one of a force, a torque or a level of vibration sensed at the third time, and wherein the first signature comprises a plot of the force, the torque or the level of vibration in a time domain for at least a portion of the first period of time.

6. The method of claim 4, wherein the first data comprises at least one of a force, a torque or a level of vibration sensed at the third time, and wherein the method further comprises:

transforming at least a portion of the first data to a frequency domain, wherein the first signature comprises a plot of the force, the torque or the level of vibration in the frequency domain for at least a portion of the first period of time.

7. The method of claim 4, wherein determining the indication of suitability of the first vehicle for performing at least the first mission based at least in part on the comparison comprises:

determining that the first signature is consistent with the second signature; and in response to determining that the first signature is consistent with the second signature, determining that the first vehicle is capable of performing at least the first mission.

8. The method of claim 4, wherein determining the indication of suitability of the first vehicle for performing at least the first mission based at least in part on the comparison comprises:

determining that the first signature is inconsistent with the second signature; and in response to determining that the first signature is inconsistent with the second signature, determining that the first vehicle is incapable of performing at least the first mission.

9. The method of claim 4, wherein the second signature is one of a plurality of signatures, wherein each of the plurality of signatures is associated with one of a plurality of vehicle anomalies, wherein determining the comparison of the first signature to at least the second signature comprises:

determining comparisons of the first signature to at least some of the plurality of signatures, wherein the second signature is one of the at least some of the plurality of signatures, wherein determining the indication of suitability of the first vehicle for performing at least the first mission based at least in part on the comparison comprises:

determining that the first signature is consistent with the second signature; and identifying the one of the plurality of vehicle anomalies associated with the second signature, wherein the indication of suitability is an indication that the first vehicle is experiencing at least the one of the plurality of vehicle anomalies associated with the second signature.

10. The method of claim 3, wherein the robotic arm comprises:

a proximal end mounted to a base of the handling system;

a distal end having an end effector, wherein the end effector is configured to engage at least the portion of the first vehicle; and at least one articulating pivot between the proximal end and the distal end, wherein the at least one articulating pivot provides one or more degrees of freedom to the robotic arm.

11. The method of claim 10, wherein the end effector comprises a first articulable arm and a second articulable arm, wherein at least one of the first articulable arm or the second articulable arm is configured to move with respect to one another between an open position of the end effector and a closed position of the end effector, wherein at least one of the first articulable arm or the second articulable arm comprises an engagement member having at least one of a size or a shape corresponding to an opening of a contact point of the portion of the vehicle, and wherein engaging the portion of the first vehicle at the first time comprises:

causing the end effector to be placed in the closed position with the portion of the vehicle between the first articulable arm and the second articulable arm, wherein the engagement member is inserted into the opening of the contact point with the end effector in the closed position.

12. The method of claim 10, wherein the handling system comprises a base coupled to a carriage having one or more wheels that are configured for travel on a set of rails or a ground surface, wherein the proximal end of the robotic arm is pivotably mounted to the base, and wherein causing the first vehicle to undergo the first movement comprises:

causing the carriage to travel on the set of rails or the ground surface at the second time.

13. The method of claim 10, wherein the first sensor is a load cell provided in association with at least one of the end effector or the at least one articulating pivot, and wherein the first data comprises at least one of a force or a torque sensed by the load cell over the first period of time.

14. The method of claim 10, wherein the first sensor is an acoustic sensor, and wherein the first data comprises acoustic data captured at the third time.

15. The method of claim 10, wherein the first sensor is one of:

an imaging device aligned to include at least the portion of the vehicle within a field of view; or a range sensor aligned to determine a distance from the range sensor to at least the portion of the vehicle; and wherein the first data comprises at least one of:
- a plurality of images captured by the imaging device over the first period of time; or
- a plurality of distances from the range sensor to at least the portion of the vehicle over the first period of time.

16. The method of claim 3, wherein, after the first movement, the first vehicle is in the second orientation, and
wherein causing the first vehicle to undergo the first movement comprises rotating the first vehicle about at least one axis by a predetermined angular extent.

17. The method of claim 3, wherein, after the first movement, the first vehicle is at the second position,
wherein the first position corresponds to a ground surface, and
wherein the second position is at a predetermined height above the ground surface.

18. A method comprising:
identifying a first signature representative of a response of a vehicle to a movement, wherein the movement comprises a predetermined change in at least one of a position or an orientation of the vehicle while traveling at a predetermined velocity, and wherein the first signature was derived based on first data captured during or after subjecting the vehicle to the movement with the vehicle in a sound condition;
determining that a vehicle completed one or more operations prior to a first time;
after the vehicle has completed the one or more operations,
  engaging, by a distal end of a robotic arm of a handling system, a portion of the vehicle at the first time,
    wherein the vehicle is in a first location at the first time,
    wherein the handling system further comprises a base and a carriage having one or more wheels that are configured for travel on rails, and
    wherein the proximal end of the robotic arm is pivotably mounted to the base;
  causing the handling system to travel on a set of rails at the predetermined velocity; and
  with the handling system traveling on the set of rails at the predetermined velocity,
    causing the handling system to subject the vehicle to the movement;
    capturing, by at least one sensor, second data during or after the movement;
    deriving a second signature representative of a response of the vehicle to the movement based at least in part on the second data;
    generating a comparison of the second signature to the first signature; and
    determining that the vehicle is in the sound condition based at least in part on the comparison.

19. The method of claim 18, wherein the first data comprises forces or torques imparted on the robotic arm during or after the movement with the vehicle in the sound condition,
wherein the first signature comprises a plot of the first data with respect to time,
wherein the second data comprises forces or torques imparted on the robotic arm during or after the movement in a time domain, and
wherein deriving the second signature comprises:
  generating a plot of at least a portion of the second data with respect to time,
wherein the second signature comprises the plot of at least the portion of the second data with respect to time.

20. The method of claim 18, wherein the first data comprises forces or torques imparted on the robotic arm during or after the movement with the vehicle in the sound condition,
wherein the first signature comprises a plot of the first data with respect to time,
wherein the second data comprises forces or torques imparted on the robotic arm during or after the movement in a time domain, and
wherein deriving the second signature comprises:
  transforming at least a portion of the second data to a frequency domain;
  generating a plot of at least the transformed portion of the second data with respect to frequency;
wherein the second signature comprises the plot of at least the transformed portion of the second data with respect to frequency.

* * * * *